United States Patent
Okutsu

(10) Patent No.: US 10,175,338 B2
(45) Date of Patent: Jan. 8, 2019

(54) LOCATION INFORMATION DETERMINATION SYSTEM

(71) Applicant: FUJITSU LIMITED, Kawasaki-shi, Kanagawa (JP)

(72) Inventor: Akihiko Okutsu, Suginami (JP)

(73) Assignee: FUJITSU LIMITED, Kawasaki (JP)

( * ) Notice: Subject to any disclaimer, the term of this patent is extended or adjusted under 35 U.S.C. 154(b) by 179 days.

(21) Appl. No.: 14/957,518

(22) Filed: Dec. 2, 2015

(65) Prior Publication Data

US 2016/0202343 A1  Jul. 14, 2016

(30) Foreign Application Priority Data

Jan. 9, 2015 (JP) ................................. 2015-003155

(51) Int. Cl.
*G01S 5/02* (2010.01)
*H04W 4/02* (2018.01)
(Continued)

(52) U.S. Cl.
CPC .......... *G01S 5/0257* (2013.01); *G01C 21/206* (2013.01); *G01S 11/14* (2013.01); *G01S 11/16* (2013.01); *H04W 4/02* (2013.01)

(58) Field of Classification Search
CPC . G01S 11/16; G01S 11/14; G01S 5/30; G01S 3/48; G01S 5/186; G01S 5/02;
(Continued)

(56) References Cited

U.S. PATENT DOCUMENTS 5,491,670 A * 2/1996 Weber ....................... G01S 5/30
367/127
8,817,578 B2 * 8/2014 Izumi ....................... G01S 3/48
367/125
(Continued)

FOREIGN PATENT DOCUMENTS

JP  55-128109  10/1980
JP  10-48309   2/1998
(Continued)

OTHER PUBLICATIONS

Priyantha et al., "The Cricket Location-Support System", 6th ACM International Conference on Mobile Computing and Networking (ACM MOBICOM).
(Continued)

*Primary Examiner* — Bernarr E Gregory
*Assistant Examiner* — Nuzhat Pervin
(74) *Attorney, Agent, or Firm* — Maschoff Brennan

(57) ABSTRACT

A terminal device includes a reception unit configured to receive first and second electromagnetic waves and first and second sound waves; and a processor configured to determine first and second frequencies respectively indicating transmission frequencies of the first and second sound waves based on the first and second electromagnetic waves, and determine first and second beacons from which the first and second sound waves are transmitted, based on the determined first and second frequencies, wherein the processor determines a location of the terminal device based on the determined first and second beacons.

9 Claims, 23 Drawing Sheets

(51) Int. Cl.
    *G01C 21/20*     (2006.01)
    *G01S 11/16*     (2006.01)
    *G01S 11/14*     (2006.01)

(58) Field of Classification Search
    CPC ..... G01S 13/753; G01S 1/725; G01C 21/206;
              H04W 4/02; H04W 48/16; H04B 11/00;
               A01K 11/006; G06F 3/165
    USPC ......................................................... 342/464
    See application file for complete search history.

(56) References Cited

U.S. PATENT DOCUMENTS

| | | | |
|---|---|---|---|
| 8,981,988 B2* | 3/2015 | Kojima | G01S 13/753 |
| | | | 342/175 |
| 9,069,058 B2* | 6/2015 | Booij | G01S 1/725 |
| 2009/0154294 A1* | 6/2009 | Jeong | G01S 5/30 |
| | | | 367/128 |
| 2009/0295639 A1 | 12/2009 | Zhao et al. | |
| 2010/0157738 A1* | 6/2010 | Izumi | G01S 3/48 |
| | | | 367/125 |
| 2011/0090762 A1* | 4/2011 | Rhodes | H04B 11/00 |
| | | | 367/131 |
| 2012/0306683 A1* | 12/2012 | Viikari | A01K 11/006 |
| | | | 342/51 |
| 2014/0253389 A1* | 9/2014 | Beauregard | G01S 5/02 |
| | | | 342/458 |
| 2014/0286133 A1* | 9/2014 | Li | G01S 5/186 |
| | | | 367/117 |
| 2016/0088549 A1* | 3/2016 | Dominic | H04W 48/16 |
| | | | 455/515 |
| 2017/0048618 A1* | 2/2017 | Shinotsuka | G06F 3/165 |

FOREIGN PATENT DOCUMENTS

| | | |
|---|---|---|
| JP | 2001-66360 | 3/2001 |
| JP | 2003-044213 | 2/2003 |
| JP | 2007-003493 | 1/2007 |
| JP | 2007-093313 | 4/2007 |
| JP | 2009-145176 | 7/2009 |
| JP | 2009-288245 | 12/2009 |

OTHER PUBLICATIONS

EESR, The extended European search report of European Application No. 15196376.6 dated May 24, 2016.
Office Action of Japanese Patent Application No. 2015-003155 dated Sep. 25, 2018 with Machine Translation.

* cited by examiner

FIG. 7

| LONGITUDE / LATITUDE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 20 | 20.1 | 20.2 | 20.3 | 20.4 | 20.5 | 20.6 | 20.7 | 20.8 | 20.9 | 21 | 21.1 | 21.2 | 21.3 | 21.4 | 21.5 |
| 1 | 21.6 | 21.7 | 21.8 | 21.9 | 22 | 22.1 | 22.2 | 22.3 | 22.4 | 22.5 | 22.6 | 22.7 | 22.8 | 22.9 | 23 | 23.1 |
| 2 | 23.2 | 23.3 | 23.4 | 23.5 | 23.6 | 23.7 | 23.8 | 23.9 | 24 | 24.1 | 24.2 | 24.3 | 24.4 | 24.5 | 24.6 | 24.7 |
| 3 | 24.8 | 24.9 | 25 | 25.1 | 25.2 | 25.3 | 25.4 | 25.5 | 25.6 | 25.7 | 25.8 | 25.9 | 26 | 26.1 | 26.2 | 26.3 |
| 4 | 26.4 | 26.5 | 26.6 | 26.7 | 26.8 | 26.9 | 27 | 27.1 | 27.2 | 27.3 | 27.4 | 27.5 | 27.6 | 27.7 | 27.8 | 27.9 |
| 5 | 28 | 28.1 | 28.2 | 28.3 | 28.4 | 28.5 | 28.6 | 28.7 | 28.8 | 28.9 | 29 | 29.1 | 29.2 | 29.3 | 29.4 | 29.5 |
| 6 | 29.6 | 29.7 | 29.8 | 29.9 | 30 | 30.1 | 30.2 | 30.3 | 30.4 | 30.5 | 30.6 | 30.7 | 30.8 | 30.9 | 31 | 31.1 |
| 7 | 31.2 | 31.3 | 31.4 | 31.5 | 31.6 | 31.7 | 31.8 | 31.9 | 32 | 32.1 | 32.2 | 32.3 | 32.4 | 32.5 | 32.6 | 32.7 |
| 8 | 32.8 | 32.9 | 33 | 33.1 | 33.2 | 33.3 | 33.4 | 33.5 | 33.6 | 33.7 | 33.8 | 33.9 | 34 | 34.1 | 34.2 | 34.3 |
| 9 | 34.4 | 34.5 | 34.6 | 34.7 | 34.8 | 34.9 | 35 | 35.1 | 35.2 | 35.3 | 35.4 | 35.5 | 35.6 | 35.7 | 35.8 | 35.9 |
| 10 | 36 | 36.1 | 36.2 | 36.3 | 36.4 | 36.5 | 36.6 | 36.7 | 36.8 | 36.9 | 37 | 37.1 | 37.2 | 37.3 | 37.4 | 37.5 |
| 11 | 37.6 | 37.7 | 37.8 | 37.9 | 38 | 38.1 | 38.2 | 38.3 | 38.4 | 38.5 | 38.6 | 38.7 | 38.8 | 38.9 | 39 | 39.1 |
| 12 | 39.2 | 39.3 | 39.4 | 39.5 | 39.6 | 39.7 | 39.8 | 39.9 | 40 | 40.1 | 40.2 | 40.3 | 40.4 | 40.5 | 40.6 | 40.7 |
| 13 | 40.8 | 40.9 | 41 | 41.1 | 41.2 | 41.3 | 41.4 | 41.5 | 41.6 | 41.7 | 41.8 | 41.9 | 42 | 42.1 | 42.2 | 42.3 |
| 14 | 42.4 | 42.5 | 42.6 | 42.7 | 42.8 | 42.9 | 43 | 43.1 | 43.2 | 43.3 | 43.4 | 43.5 | 43.6 | 43.7 | 43.8 | 43.9 |
| 15 | 44 | 44.1 | 44.2 | 44.3 | 44.4 | 44.5 | 44.6 | 44.7 | 44.8 | 44.9 | 45 | 45.1 | 45.2 | 45.3 | 45.4 | 45.5 |

FIG. 13

| RADIO FREQUENCY (MHz) | SOUND FREQUENCY (KHz) | LATITUDE | LONGITUDE |
|---|---|---|---|
| 54 | 20 | 140 | 35 |
| 54.1 | 20.1 | 140.001 | 35 |
| 54.2 | 20.2 | 140.002 | 35 |
| 54.3 | 20.3 | 140.003 | 35 |
| 54.4 | 20.4 | 140.004 | 35 |
| 54.5 | 20.5 | 140.005 | 35 |
| 54.6 | 20.6 | 140.006 | 35 |
| 54.7 | 20.7 | 140.007 | 35 |
| 54.8 | 20.8 | 140.008 | 35 |
| 54.9 | 20.9 | 140.009 | 35 |
| 55 | 21 | 140 | 35.001 |
| 55.1 | 21.1 | 140.001 | 35.001 |
| 55.2 | 21.2 | 140.002 | 35.001 |
| 55.3 | 21.3 | 140.003 | 35.001 |
| 55.4 | 21.4 | 140.004 | 35.001 |
| 55.5 | 21.5 | 140.005 | 35.001 |
| 55.6 | 21.6 | 140.006 | 35.001 |
| 55.7 | 21.7 | 140.007 | 35.001 |
| 55.8 | 21.8 | 140.008 | 35.001 |
| 55.9 | 21.9 | 140.009 | 35.001 |
| 56 | 22 | 140 | 35.002 |
| 56.1 | 22.1 | 140.001 | 35.002 |
| 56.2 | 22.2 | 140.002 | 35.002 |
| 56.3 | 22.3 | 140.003 | 35.002 |
| 56.4 | 22.4 | 140.004 | 35.002 |
| 56.5 | 22.5 | 140.005 | 35.002 |
| 56.6 | 22.6 | 140.006 | 35.002 |
| 56.7 | 22.7 | 140.007 | 35.002 |
| 56.8 | 22.8 | 140.008 | 35.002 |
| 56.9 | 22.9 | 140.009 | 35.002 |

FIG. 16

| BEACON ID | SOUND FREQUENCY (KHz) | LATITUDE | LONGITUDE |
|---|---|---|---|
| 4029543200 | 20 | 140 | 35 |
| 4029543201 | 20.1 | 140.001 | 35 |
| 4029543202 | 20.2 | 140.002 | 35 |
| 4029543203 | 20.3 | 140.003 | 35 |
| 4029543204 | 20.4 | 140.004 | 35 |
| 4029543205 | 20.5 | 140.005 | 35 |
| 4029543206 | 20.6 | 140.006 | 35 |
| 4029543207 | 20.7 | 140.007 | 35 |
| 4029543208 | 20.8 | 140.008 | 35 |
| 4029543209 | 20.9 | 140.009 | 35 |
| 4029543210 | 21 | 140 | 35.001 |
| 4029543211 | 21.1 | 140.001 | 35.001 |
| 4029543212 | 21.2 | 140.002 | 35.001 |
| 4029543213 | 21.3 | 140.003 | 35.001 |
| 4029543214 | 21.4 | 140.004 | 35.001 |
| 4029543215 | 21.5 | 140.005 | 35.001 |
| 4029543216 | 21.6 | 140.006 | 35.001 |
| 4029543217 | 21.7 | 140.007 | 35.001 |
| 4029543218 | 21.8 | 140.008 | 35.001 |
| 4029543219 | 21.9 | 140.009 | 35.001 |
| 4029543220 | 22 | 140 | 35.002 |
| 4029543221 | 22.1 | 140.001 | 35.002 |
| 4029543222 | 22.2 | 140.002 | 35.002 |
| 4029543223 | 22.3 | 140.003 | 35.002 |
| 4029543224 | 22.4 | 140.004 | 35.002 |
| 4029543225 | 22.5 | 140.005 | 35.002 |
| 4029543226 | 22.6 | 140.006 | 35.002 |
| 4029543227 | 22.7 | 140.007 | 35.002 |
| 4029543228 | 22.8 | 140.008 | 35.002 |
| 4029543229 | 22.9 | 140.009 | 35.002 |

LOCATION INFORMATION DETERMINATION SYSTEM

CROSS-REFERENCE TO RELATED APPLICATION

This application is based upon and claims the benefit of priority of the prior Japanese Patent Application No. 2015-003155, filed on Jan. 9, 2015, the entire contents of which are incorporated herein by reference.

FIELD

The embodiments discussed herein are related to a location information determination system.

BACKGROUND

As a method of determining a location of a terminal device, there is a method utilizing electromagnetic waves and sound waves, for example. FIG. 20 is a view illustrating this method utilizing electromagnetic waves and sound waves.

Beacons 200-1 to 200-3 periodically transmit electromagnetic waves and sound waves at the same time. A terminal device 100 receives an electromagnetic wave (EM1) transmitted from the beacon 200-1, for example, and obtains location information of the beacon 200-1 from information included in the electromagnetic wave (EM1). Then, the terminal device 100 receives a sound wave (S1) and calculates a distance to the beacon 200-1 based on a difference in arrival time between the electromagnetic wave (EM1) and the sound wave (S1). The distance to the beacon 200-1 may be determined, for example, by multiplying a speed difference between an electromagnetic wave and a sound wave by the arrival time difference. In the same way, the terminal device 100 obtains location information of the beacons 200-2, 200-3, and calculates distances to the beacons 200-2, 200-3. Having obtained the location information and the distances of the three beacons, the terminal device 100 calculates the location information of the terminal device 100 by trilateration.

In a method utilizing GPS, for example, a terminal device within doors is incapable of a location determination since radio waves from a GPS satellite do not reach indoors. In contrast, in the method utilizing electromagnetic waves and sound waves, a terminal device within doors is capable of a location determination since beacons configured to transmit the electromagnetic waves and the sound waves are installed within doors.

Moreover, in the method utilizing electromagnetic waves and sound waves, installation cost of equipment may be reduced since the method uses no location server or no synchronization server. In addition, this method utilizing arrival time differences of electromagnetic waves and sound waves is capable of calculating the distances to beacons without using received power strengths of the electromagnetic waves and the sound waves, and therefore achieves improvements in the accuracy of calculation of distances between a terminal device and beacons, and also in the accuracy of location information determination of the terminal device. Meanwhile, this method utilizing arrival time differences of electromagnetic waves and sound waves is under a restriction on the number of installable beacons such that the maximum number of installable beacons is 22, for example.

The followings are examples of techniques for the method utilizing electromagnetic waves and sound waves.

Specifically, one of the techniques is for an autonomous ultrasonic indoor positioning system in which a structured ultrasonic transmitter including a single RF transmitter and multiple ultrasonic transmitters transmits ultrasonic waves at regular intervals, and a reception device calculates the location of the reception device based on differences between reception times of the ultrasonic waves at the reception device.

This technique is considered to enable provision of a highly-accurate low-cost indoor positioning system.

Another technique is for a distance measurement method in which two sound sources placed at two locations at different heights transmit electromagnetic waves and sound waves at the same time, and a terminal device calculates the distances to the two sound sources from the received waves, and calculates the horizontal distance to the sound sources in accordance with the Pythagorean theorem.

This technique is considered to enable measurement of the horizontal distance to sound sources even in a location with a large difference in height and poor visibility.

The related techniques are disclosed in, for example, Japanese Laid-open Patent Publication Nos. 2009-288245 and 10-48309.

SUMMARY

According to an aspect of the invention, a terminal device includes a reception unit configured to receive first and second electromagnetic waves and first and second sound waves; and a processor configured to determine first and second frequencies respectively indicating transmission frequencies of the first and second sound waves based on the first and second electromagnetic waves, and determine first and second beacons from which the first and second sound waves are transmitted, based on the determined first and second frequencies, wherein the processor determines a location of the terminal device based on the determined first and second beacons.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a view illustrating an example of frequencies corresponding to location information of a beacon;

FIG. 13 is a view illustrating an example of an electromagnetic wave frequency, a sound wave frequency, longitude, and latitude correspondence table;

FIG. 16 is a view illustrating an example of a beacon ID, a sound wave frequency, longitude, and latitude correspondence table;

DESCRIPTION OF EMBODIMENTS

In the foregoing method described in the background utilizing arrival time differences of electromagnetic waves and sound waves, multiple beacons transmit sound waves of an identical frequency. Thus, a terminal device may make an incorrect combination of a beacon which transmits an electromagnetic wave and a beacon which transmits a sound wave.

Figure 21:
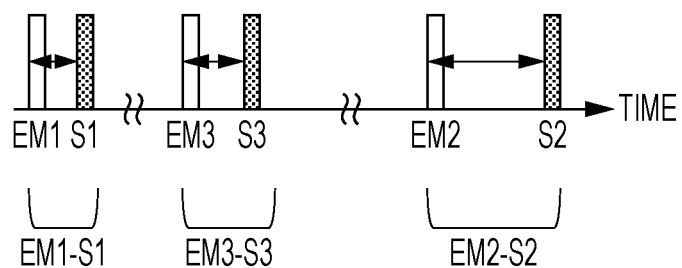
FIG. 21 is a view illustrating an example of a time chart of receiving electromagnetic waves and sound waves.
Figure 22:
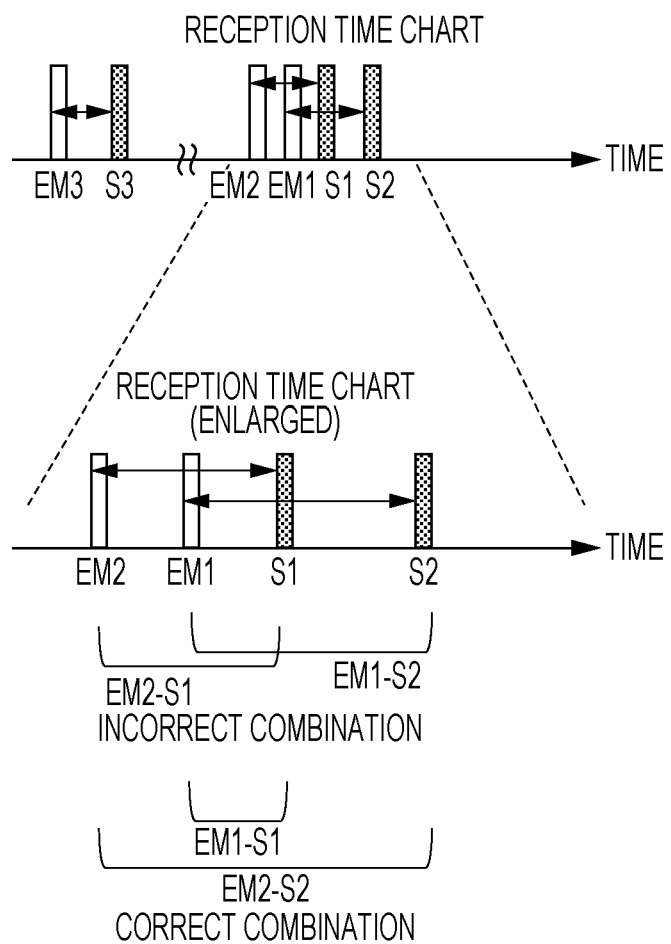
FIG. 22 is a view illustrating an example of a time chart of receiving electromagnetic waves and sound waves.
Figure 23:
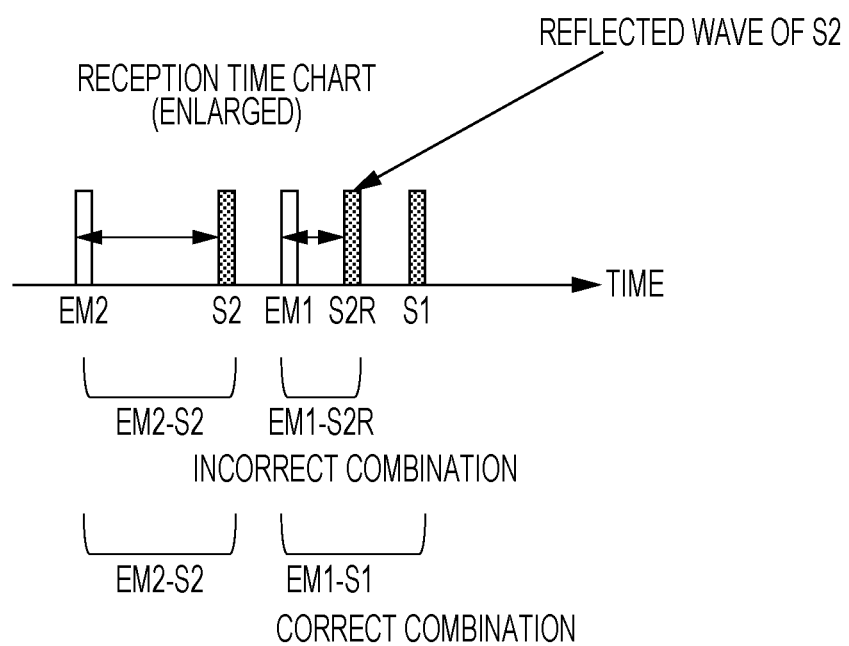
FIG. 23 is a view illustrating an example of a time chart of receiving electromagnetic waves and sound waves.

FIGS. 21, 22, and 23 are examples of time charts illustrating the reception times of electromagnetic waves and sound waves received by the terminal device 100. In FIG. 21, the terminal device receives an electromagnetic wave from each beacon, and then receives a sound wave from the each beacon. When receiving the electromagnetic wave and the sound wave sequentially in this way, the terminal device may correctly determine a combination of the electromagnetic wave and the beacons from which the sound wave is transmitted.

As illustrated in FIG. 22, the terminal device 100 receives an electromagnetic wave (EM2), an electromagnetic wave (EM1), a sound wave (S1), and a sound wave (S2), in this order. In this example, the actual transmission order of the electromagnetic waves and the sound waves by the beacons 200-1 and 200-2 is simultaneous transmission of the electromagnetic wave (EM2) and the sound wave (S2), followed by simultaneous transmission of the electromagnetic wave (EM1) and the sound wave (S1). As for the electromagnetic waves, the terminal device first receives the electromagnetic wave (EM2), and then receives the electromagnetic wave (EM1) as per the actual transmission order. Meanwhile, the terminal device may first receive the sound wave (S1) transmitted later, before reception of the sound wave (S2) transmitted earlier in some cases where the beacon 200-2 is installed farther from the terminal device than the beacon 200-1 is.

In this case, since the terminal device 100 receives the electromagnetic wave (EM1) after receiving the electromagnetic wave (EM2), the terminal device 100 waits for receptions of the two sound waves, namely, the sound wave (S2) from the beacon 200-2 and the sound wave (S1) from the beacon 200-1. In this case, the terminal device 100 receiving the sound wave (S1) may incorrectly determine this sound wave (S1) as a sound wave transmitted from the same beacon 200-2 as one that transmits the earlier received electromagnetic wave (EM2).

In another case, as illustrated in FIG. 23, the terminal device 100 receives an electromagnetic wave (EM1), a reflected sound wave (S2R) of a sound wave (S2), and a sound wave (S1), in this order. This example illustrates the case where the sound wave generates the reflected sound wave by being reflected from an indoor wall or object installed, and the reflected sound wave of the already received sound wave reaches the terminal device with delay.

In this case, the terminal device 100 receives the reflected sound wave (S2R) after receiving the electromagnetic wave (EM1), and may thus incorrectly determine this reflected sound wave (S2R) as a sound wave corresponding to the electromagnetic wave (EM1).

As illustrated in FIGS. 22 and 23, the terminal device may determine an incorrect combination of a beacon which transmits an electromagnetic wave, and a beacon which transmits a sound wave, in some cases where the reception order of the electromagnetic waves and the sound waves differs from the actual transmission order, or where the reflected sound wave of the sound wave is received with delay. When the combination is incorrect, the terminal device erroneously calculates the distances to the beacons. Thus, the terminal device is disabled from determining the correct location of the terminal device by calculating the location of the terminal device by trilateration.

The above described technique of transmitting the ultrasonic waves at regular intervals from multiple ultrasonic transmitters may lead to an incorrect combination of the electromagnetic waves and the sound waves when the electromagnetic waves and the sound waves arrive in an order different from their transmission order, or when the reflected sound wave is generated. However, no method of solving these problems has been disclosed.

In addition, the same also applies to the technique for the distance measurement method of calculating the horizontal distance to sound sources at different heights.

Therefore, none of the techniques described above is capable of calculating information on a correct location of a terminal device.

Hence, it is desired to provide a location information determination system for correctly calculating location information of a terminal device.

In addition, it is desired to provide a location information determination system having a less restriction on the number of installable beacons.

In the following, modes for carrying out the present disclosure are described.

First Embodiment

Figure 1:
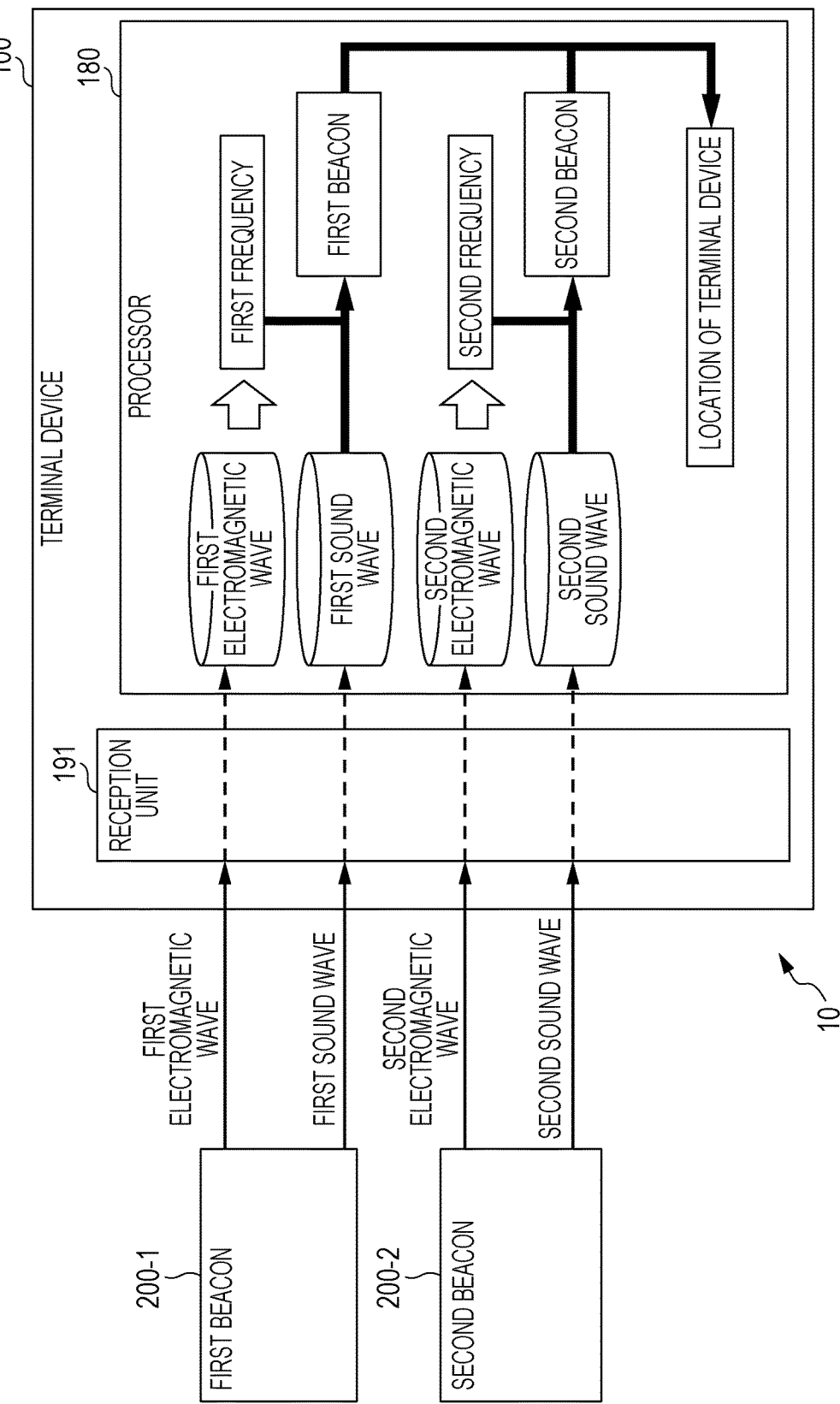
FIG. 1 is a view illustrating a configuration example of a location information determination system.

FIG. 1 illustrates a configuration example of a location information determination system 10 in a first embodiment.

The location information determination system 10 includes a terminal device 100 and beacons 200-1, 200-2.

The terminal device 100 includes a processor 180 and a reception unit 191.

The reception unit 191 is configured to receive a first electromagnetic wave and a first sound wave transmitted from the beacon 200-1 and a second electromagnetic wave and a second sound wave transmitted from the beacon 200-2. For example, the reception unit 191 demodulates the received electromagnetic wave and the sound wave, and outputs the demodulated electromagnetic wave and sound wave respectively to the processor 180 as an electromagnetic wave signal and a sound wave signal.

The processor 180 is configured to determine a first frequency indicating a transmission frequency of the first sound wave from the electromagnetic wave signal of the first electromagnetic wave received from the reception unit 191. The processor 180 may read the first frequency from, for example, information of the first frequency included in the electromagnetic wave signal of the first electromagnetic wave. The processor 180 may also calculate the first frequency from, for example, location information such as latitude or longitude of the first beacon, which is included in the electromagnetic wave signal of the first electromagnetic wave. Furthermore, the processor 180 may read the first frequency from, for example, a table prepared in advance. The table prepared in advance may be a table presenting, for example, a relation among a beacon ID indicating identification information of the beacon, a frequency of the first electromagnetic wave, location information of the beacon 200-1, and the first frequency. The processor 180 confirms that a frequency of the sound wave signal of the first sound wave received from the reception unit 191 matches the determined first frequency, and determines that the first sound wave is transmitted from the beacon 200-1. By performing processing similar to the processing described above, the processor 180 determines that the second sound wave is transmitted from the beacon 200-2. When the processor 180 determines the beacons from which the first and the second sound waves are transmitted, respectively, as the beacons 200-1 and 200-2, the processor 180 calculates a location of the terminal device 100. As a method of calculating the location of the terminal device 100, for example, the distance to the beacon 200-1 is calculated from a difference in arrival time between the first electromagnetic wave and the first sound wave, and the distance to the beacon 200-2 is calculated from a difference in arrival time between the second electromagnetic wave and the second sound wave. Furthermore, the location of the terminal device is calculated based on the calculated distance and location information of the beacons 200-1 and 200-2. Note that while there are two beacons in FIG. 1, there may be three or more beacons, for example. For example, when there are three beacons, a location of the terminal device 100 may be calculated by trilateration, by using the distance to each of the beacons and location information of each of the beacons.

The beacon 200-1 is configured to transmit the first electromagnetic wave and the first sound wave, and the beacon 200-2 is configured to transmit the second electromagnetic wave and the second sound wave. The first sound wave and the second sound wave are each of a different frequency. Since the frequencies of the first and the second sound waves are different, the terminal device 100 may determine from which beacons the first and second sound waves are transmitted respectively. Note that the electromagnetic waves and the sound waves may be transmitted at the same time or periodically at regular intervals, for example.

In the first embodiment, since the sound wave of a different frequency is used for each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for each beacon 200, there is less interference between the sound waves. Thus, since there is less interference of the sound waves even when multiple beacons 200 are installed in proximity, a restriction on the number of installable beacons may be relaxed.

Second Embodiment

Figure 2:
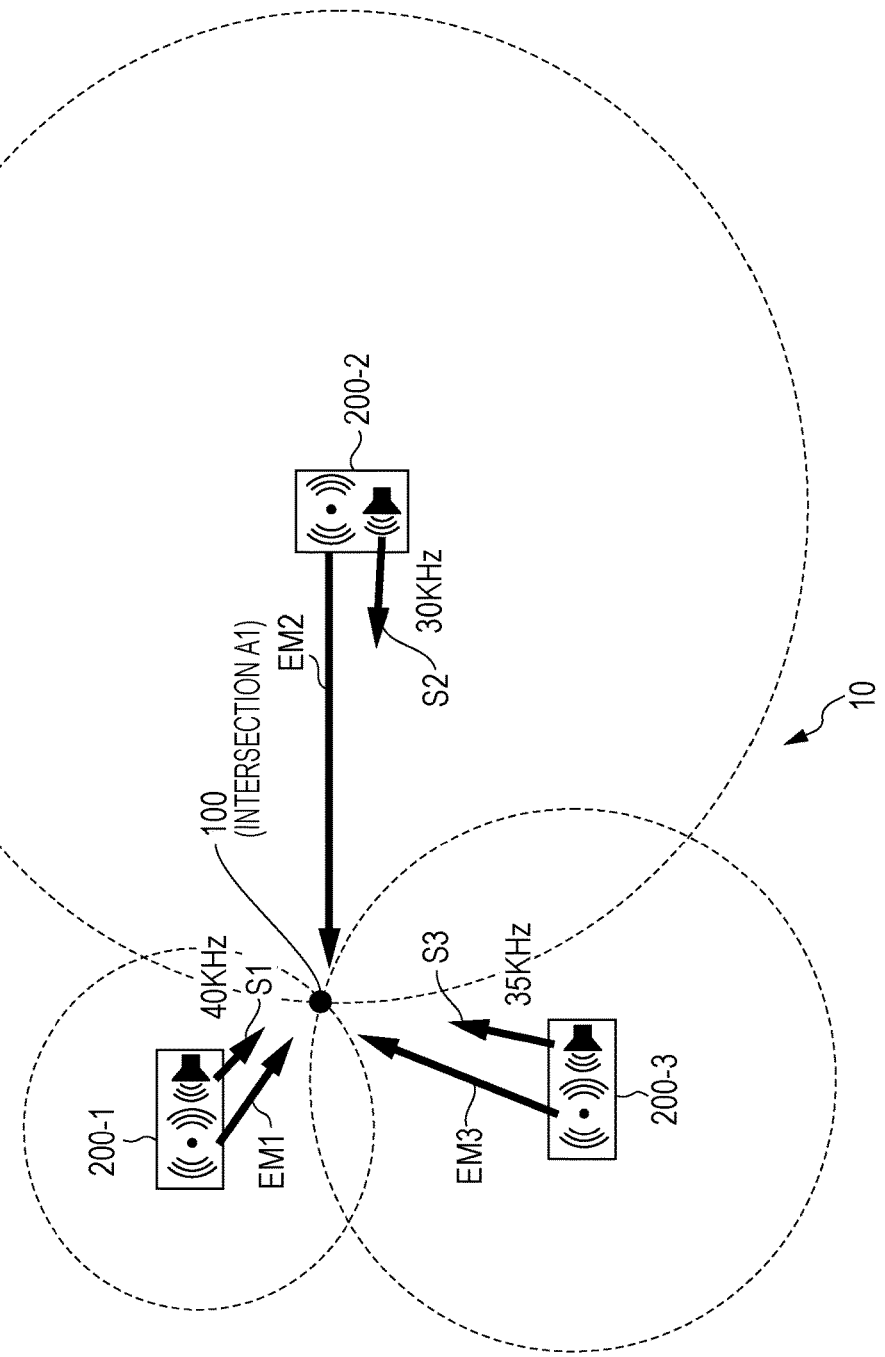
FIG. 2 is a view illustrating a configuration example of the location information determination system.

A second embodiment is described hereinafter.
<Method of Calculating Location Information>
A method of calculating location information of a terminal device 100 is described. FIG. 2 is a view illustrating a configuration example of a location information determination system 10 for describing the method of calculating location information.

The location information determination system 10 includes the terminal device 100 and the beacons 200-1 to 200-3. The beacons 200-1 to 200-3 regularly transmit electromagnetic waves and sound waves at the same time. The beacons 200-1 to 200-3 transmit the sound waves of different frequencies, respectively. For example, as illustrated in FIG. 2, the beacon 200-1 transmits a sound wave (S1) at 40 kHz, the beacon 200-2 transmits a sound wave (S2) at 30 kHz, and the beacon 200-3 transmits a sound wave (S3) at 35 kHz.

The terminal device 100 is configured to receive the electromagnetic waves and the sound waves transmitted from the beacons 200-1 to 200-3 and calculates the distances to the beacons 200-1 to 200-3 from arrival time differences of the electromagnetic waves and the sound waves. In this embodiment, in order to correctly measure the arrival time differences between the electromagnetic waves and the sound waves, the terminal device 100 determines from which beacon the sound wave is transmitted, based on the frequency of the received sound waves. For example, suppose that the terminal device 100 receives the sound wave (S2) from the beacon 200-2 after receiving an electromagnetic wave (EM1) from the beacon 200-1. Even in such a case, since the sound wave (S1) from the beacon 200-1 is transmitted at 40 kHz, the terminal device 100 does not incorrectly determine that the sound wave (S2) transmitted at 30 kHz as the sound wave from the beacon 200-1.

When calculating the distances to the three or more beacons 200-1 to 200-3, the terminal device 100 calculates location information of the terminal device 100. The terminal device 100 calculates a location of the terminal device 100 from the location information and distances of the three beacons 200-1 to 200-3 by trilateration.

As described above, the beacons 200-1 to 200-3 transmit the sound waves of different frequencies respectively, and the terminal device 100 determines any of the beacons 200-1 to 200-3 as a transmission source of each of the sound waves, based on the frequency of the sound wave. Thus, the terminal device 100 makes a correct combination of each of the electromagnetic waves and one of the beacons 200-1 to 200-3 as a transmission source from which the sound wave is transmitted.

Thus, the terminal device 100 may correctly calculate a location of the terminal device 100 by correctly calculating the distances to the beacons 200-1 to 200-3.

In addition, in this case, since the sound wave of a different frequency is transmitted from each of the beacons 200-1 to 200-3, no interference is generated between the sound waves even when multiple the beacons 200-1 to 200-3 transmit the sound waves at the same time. Thus, since no interference of the sound waves is generated even when the beacons 200-1 to 200-3 are installed in proximity, the beacons 200-1 to 200-3 may be installed without a restriction on the number of installable beacons for suppressing interference of sound waves.

Note that the beacons 200-1 to 200-3 may be hereinafter referred to as the beacons 200.

<Configuration Example of the Location Information Determination System 10>

Figure 3:
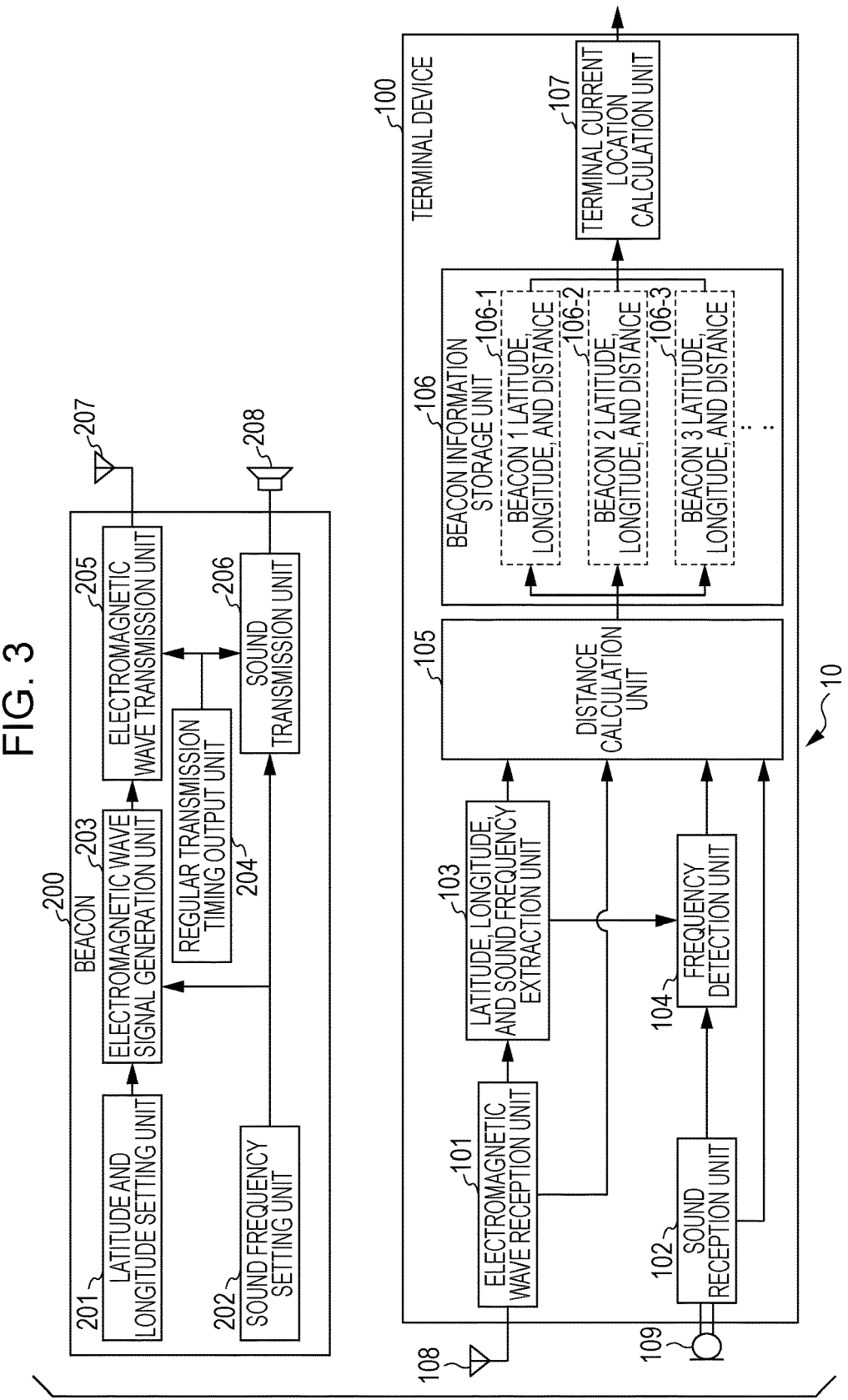
FIG. 3 is a view illustrating a configuration example of the location information determination system.

A configuration example of the location information determination system 10 is described. FIG. 3 illustrates the configuration example of the location information determination system 10.

The location information determination system 10 is a system for the terminal device 100 to calculate a current location of the terminal device 100. The location information determination system 10 includes the terminal device 100 and the beacon 200. Although there is one beacon 200 in the location information determination system 10 in FIG. 3, there may be more than one.

The beacon 200 includes a latitude and longitude setting unit 201, a sound frequency setting unit 202, an electromagnetic wave signal generation unit 203, a regular transmission timing output unit 204, an electromagnetic wave transmission unit 205, a sound transmission unit 206, an antenna 207, and a speaker 208.

The latitude and longitude setting unit 201 outputs information of longitude and latitude at which the beacon 200 is installed, to the electromagnetic wave signal generation unit 203.

The sound frequency setting unit 202 outputs frequency information of the sound wave to be transmitted by the beacon 200, to the electromagnetic wave signal generation unit 203 and the sound transmission unit 206.

The electromagnetic wave signal generation unit 203 generates an electromagnetic wave signal including longitude information and latitude information received from the latitude and longitude setting unit 201 as well as frequency information of the sound wave received from the sound frequency setting unit 202, and outputs the electromagnetic wave signal to the electromagnetic wave transmission unit 205. Note that a table presenting, for example, a relation between latitude and longitude of the beacon and a sound wave frequency may be prepared in advance in the terminal device 100. In this case, the electromagnetic wave to be transmitted by the beacon 200 may not include the latitude information and the longitude information.

The regular transmission timing output unit 204 internally includes a clock and regularly notifies the electromagnetic wave transmission unit 205 and the sound transmission unit 206 of timing to transmit an electromagnetic wave and a sound wave. Note that the timing to transmit an electromagnetic wave and a sound wave may be at the same time or at regular intervals, for example. When the timing to transmit the electromagnetic wave and the sound wave is at regular intervals, the regular transmission timing output unit 204 shares information of, for example, how long seconds are set for the each interval, with the terminal device 100.

The electromagnetic wave transmission unit 205 modulates an electromagnetic wave signal received from the electromagnetic wave signal generation unit 203, and outputs the modulated electromagnetic wave signal to the antenna 207 at the transmission timing notified by the regular transmission timing output unit 204.

The sound transmission unit 206 generates a sound wave signal of a frequency received from the sound frequency setting unit 202, modulates the sound wave signal generated, and outputs the modulated sound wave signal to the speaker 208 at the transmission timing notified by the regular transmission timing output unit 204.

The antenna 207 transmits the electromagnetic wave signal received from the electromagnetic wave transmission unit 205.

The speaker 208 transmits the sound wave signal received from the sound transmission unit 206.

The terminal device 100 includes an electromagnetic wave reception unit 101, a sound reception unit 102, a latitude, longitude, and sound frequency extraction unit 103, a frequency detection unit 104, a distance calculation unit 105, a beacon information memory unit 106, a terminal current location calculation unit 107, an antenna 108, and a microphone 109.

The electromagnetic wave reception unit 101 receives an electromagnetic wave signal from the antenna 108. The electromagnetic wave reception unit 101 outputs reception time of the electromagnetic wave to the distance calculation unit 105. The electromagnetic wave reception unit 101 also demodulates the received electromagnetic wave signal and outputs the demodulated electromagnetic wave signal to the latitude, longitude, and sound frequency extraction unit 103.

The sound reception unit 102 receives a sound wave signal from the microphone 109. The sound reception unit 102 outputs the reception time of the sound wave to the distance calculation unit 105. The sound reception unit 102 also demodulates the sound wave signal received from the microphone 109 and outputs the modulated sound wave signal to the frequency detection unit 104.

The latitude, longitude, and sound frequency extraction unit 103 reads latitude and longitude information of the beacon 200 from the electromagnetic wave signal received from the electromagnetic wave reception unit 101, and outputs the latitude and longitude information to the distance calculation unit 105. The latitude, longitude, and sound frequency extraction unit 103 also reads a frequency of a sound wave to be transmitted by the beacon 200 from the electromagnetic wave signal received from the electromagnetic wave reception unit 101, and outputs the frequency to the frequency detection unit 104.

The frequency detection unit 104 receives the frequency of the sound wave, transmitted by the beacon 200, from the latitude, longitude, and sound frequency extraction unit 103 and stores the frequency in an internal memory. When receiving the sound wave signal from the sound reception unit 102, for example, the frequency detection unit 104 also calculates a frequency of the received sound wave signal with the zero-cross method or the like, and determines whether there is any frequency that matches frequency information stored in the internal memory. When there is a match of frequencies, the frequency detection unit 104 outputs, to the distance calculation unit 105, latitude and longitude information of the beacons 200 including the frequency information.

The distance calculation unit 105 stores, in an internal memory, the reception time of the electromagnetic wave received from the electromagnetic wave reception unit 101 and the latitude and longitude information of the beacon 200 received from the latitude, longitude, and sound frequency extraction unit 103. When receiving, from the frequency detection unit 104, the latitude and longitude information of the beacons 200 for which the frequencies matched, the distance calculation unit 105 also stores the latitude and longitude information together with the reception time of the sound wave received from the sound reception unit 102. When receiving all of the information of latitude and longitude of a certain beacon 200, reception time of the electromagnetic wave, and reception time of the corresponding sound wave, the distance calculation unit 105 calculates the distance of the certain beacon 200 from the terminal device 100. The distance calculation unit 105 calculates the distance to the certain beacon 200 from, for example, a difference in speed of the electromagnetic wave and the sound wave, and a difference in the reception time of the electromagnetic wave and the sound wave. The distance calculation unit 105 outputs, to the beacon information memory unit 106, the information of the calculated distance to the beacon 200 and the information of latitude and longitude of the beacon 200.

The beacon information memory unit 106 includes memory areas 106-1, 106-2, 106-3 for the latitude or longitude information of the beacon 200, and the distance from the terminal device 100. Although three memory areas are present in FIG. 3, four or more memory areas, for example, may be present. The beacon information memory unit 106 sequentially stores the latitude and longitude information received from the distance calculation unit 105 and the distance from the terminal device 100, as beacon information, starting from the memory area 106-1. When storing the beacon information, the beacon information memory unit 106 notifies the terminal current location calculation unit 107 that the beacon information is updated.

The terminal current location calculation unit 107 calculates location information of the terminal device 100 from the stored beacon information. The terminal current location calculation unit 107 outputs the calculated location information of the terminal device 100 to, for example, a map app that uses latitude and longitude of the terminal device or to a display app that controls a display unit of the terminal device 100. Note that the terminal current location calculation unit 107 may start to calculate terminal location information, triggered by, for example, expiration of a timer which monitors a cycle of searching beacons or by a notice from the beacon information memory unit 106.

The antenna 108 receives the electromagnetic wave transmitted from the beacon 200. The antenna 108 outputs the received electromagnetic wave signal to the electromagnetic wave reception unit 101.

The microphone 109 receives the sound wave transmitted from the beacon 200. The microphone 109 outputs the received sound wave signal to the sound reception unit 102.

<Operation Example of the Terminal Device 100>

Figure 4:
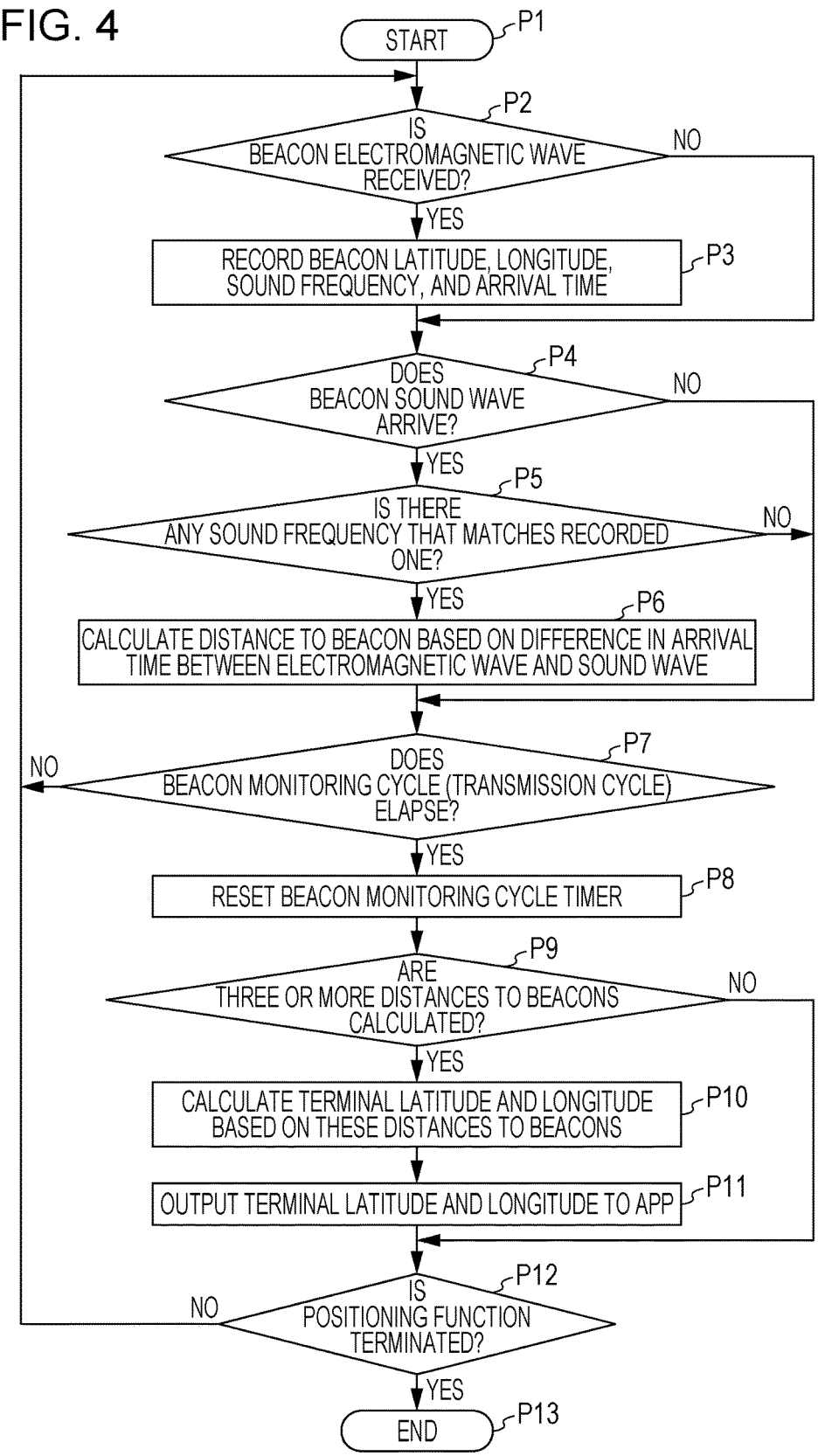
FIG. 4 is a flow illustrating an operation example of a terminal device.

An operation example of the terminal device 100 is described hereinafter. FIG. 4 illustrates an example of a process flow for determining a location of the terminal device 100.

When receiving an electromagnetic wave or a sound wave, the terminal device 100 starts processing to determine location information of the terminal device 100 (step P1).

When receiving the electromagnetic wave from the beacon 200 by the antenna 108 (Y in step P2), the terminal device 100 causes the latitude, longitude, and sound frequency extraction unit 103 to extract the latitude and longitude of the beacon 200 and the frequency of the sound wave to transmit, from the electromagnetic wave signal. The terminal device 100 stores the extracted information of latitude and longitude and the time of the electromagnetic wave in the internal memory of the distance calculation unit 105 (step P3). The terminal device 100 also stores the extracted information of the frequency of the sound wave in the internal memory of the frequency detection unit 104 (step P3). Then, when the beacon monitoring cycle does not elapse (N in step P4 and N in step P7), the terminal device 100 proceeds to step P2.

Then, when receiving the sound wave from the beacon 200 by the microphone 109 (N in step P2 and Y in step P4), the terminal device 100 stores arrival time of the sound wave in the internal memory of the distance calculation unit 105. Then, the terminal device 100 causes the frequency detection unit 104 to compare the frequency of the received sound wave with the frequency stored in the memory to determine whether there is any match (step P5). When there is a match of frequencies (Y in step P5), the terminal device 100 causes the distance calculation unit 105 to calculate the distance to the beacon 200 from a difference in the arrival time of the electromagnetic wave and the sound wave transmitted from the beacon 200 (step P6). The terminal device 100 stores the distance calculated by the distance calculation unit 105 in an internal memory of a beacon information memory unit 106. Then, when the beacon monitoring cycle does not elapse (N in step P7), the terminal device 100 proceeds to step P2.

When the beacon monitoring cycle elapses (Y in step P7), the terminal device 100 resets the beacon monitoring cycle timer (step P8). Then, when three or more distances from the beacon 200 to the terminal device 100 are calculated (Y in step P9), the terminal device 100 causes the terminal current location calculation unit 107 to calculate the location information of the terminal device 100 (step P10). Using the information of three beacons 200 which is stored in the internal memory of the beacon information memory unit 106, the terminal current location calculation unit 107 calculates the location information of the terminal device 100. The terminal current location calculation unit 107 outputs the calculated location information of the terminal device 100 to, for example, an app that uses location information (step P11), and finishes the processing when a positioning function is terminated (Y in step P12, step P13).

In the processing described above, a description is given using an example of FIG. 22, for example.

First, the terminal device 100 receives an electromagnetic wave (EM3) (Y in step P2), and records latitude of the beacon or the like (step P3). When the terminal device 100 has not received a beacon sound wave (N in step P4) and when the beacon monitoring cycle does not elapse (N in step P7), the terminal device 100 returns processing to step P2. Then, the terminal device 100 receives the sound wave (S3) (N in step P2, Y in step P4). Since the frequency of the sound wave (S3) matches the recorded frequency (Y in step P5), the terminal device calculates the distance to the beacon 200-3 (step P6), and returns processing to step P2 when the beacon monitoring cycle does not elapse (N in step P7).

Then, the terminal device 100 receives an electromagnetic wave (EM2) from the beacon 200-2 (Y in step P2), and records the frequency of the sound wave (S2) (N in steps P3 and P4, N in step P7). When receiving the electromagnetic wave (EM1) from the beacon 200-1, the terminal device 100 similarly records the frequency of the sound wave (S1) (N in steps P3 and P4, N in step P7).

Then, when receiving the sound wave (S1) (N in step P2, Y in step P4), the terminal device 100 determines that the sound wave (S1) is recorded in the recorded frequencies and that there is a matching frequency (Y in step P5).

In addition, in the processing described above, a description is given using an example of FIG. 23, for example.

First, the terminal device 100 receives the electromagnetic wave (EM2) (Y in step P2, step P3), and finishes processing (N in step P4, N in step P7). Then, the terminal device 100 receives the sound wave (S2) (N in step P2, Y in step P4), and calculates the distance to the beacon 200-2 (step P6) since the frequency of the sound wave (S2) matches the recorded frequency (Y in step P5), and finishes processing (N in step P7).

Then, the terminal device 100 receives the electromagnetic wave (EM1) from the beacon 200-1 (Y in step P2) and records the frequency of the sound wave (S1) (N in steps P3 and P4, N in step P7). Then, when receiving the reflected wave (S2R) (N in step P2, Y in step P4), the terminal device 100 determines that there is no matching frequency since only the frequency of the sound wave (S1) is recorded in the recorded frequencies (N in step P5).

As described above, even when the electromagnetic waves and the sound waves arrive in an order different from their transmission order or when the reflected wave is generated, the terminal device 100 may determine a correct combination of the electromagnetic waves and the sound waves without making a mistake. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of installable beacons may be relaxed.

Third Embodiment

A third embodiment is described hereinafter. In the third embodiment, no sound wave frequency information is included in an electromagnetic wave, and the sound wave frequency is calculated from location information of the beacon.

<Configuration Example of the Location Information Determination System 10>

Figure 5:
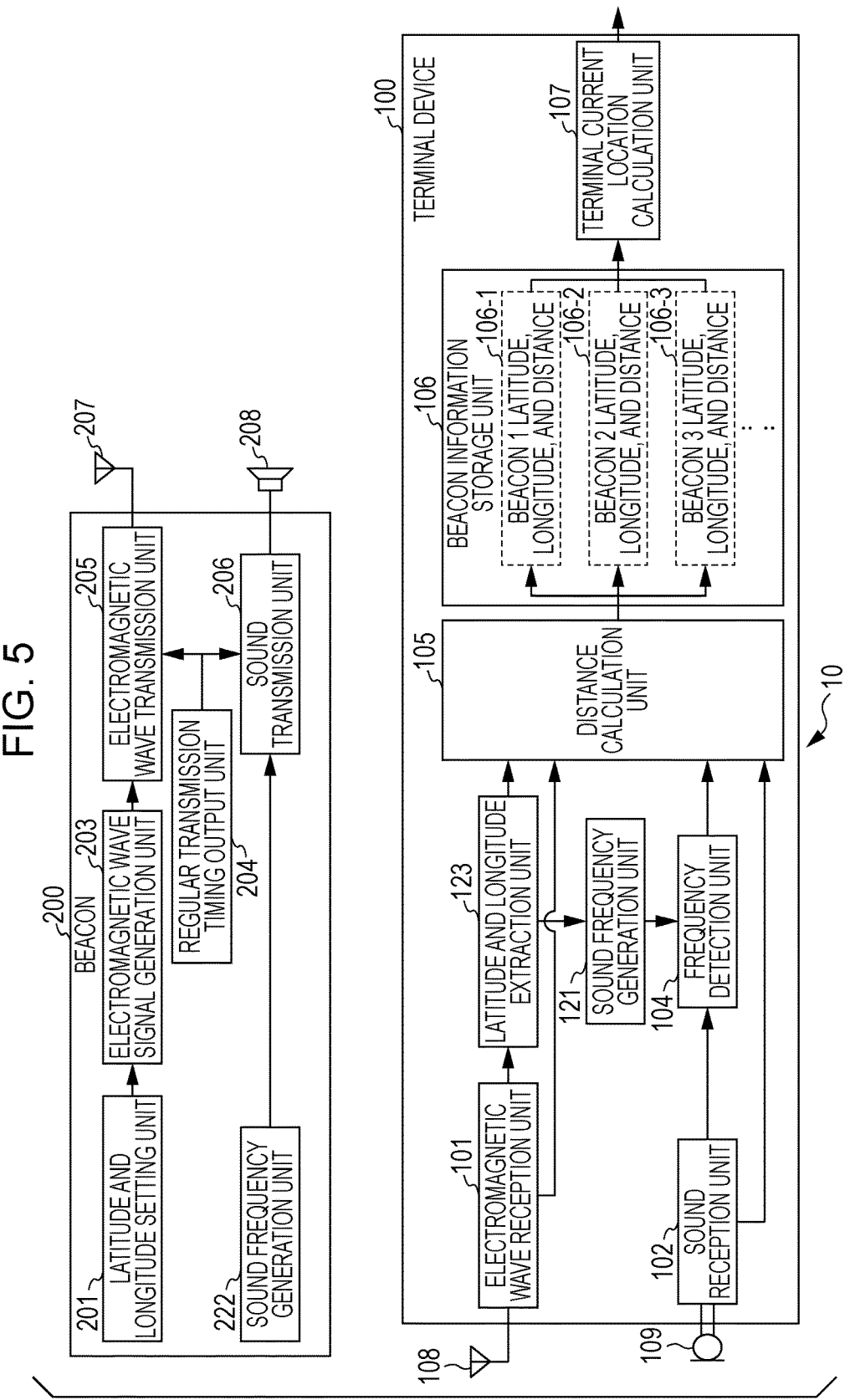
FIG. 5 is a view illustrating a configuration example of the location information determination system.

A configuration of a location information determination system 10 is described. FIG. 5 illustrates a configuration example of the location information determination system 10.

The beacon 200 further includes a sound frequency generation unit 222.

The sound frequency generation unit 222 calculates the frequency to be used for the sound wave, from latitude and longitude of the beacon 200. A method of calculating a frequency of the sound wave of the beacon 200 in a third embodiment is described below. The sound frequency generation unit 222 outputs the calculated frequency to the sound transmission unit 206. Note that since the beacon 200 in this embodiment does not include the frequency information of the sound wave in an electromagnetic wave, the sound frequency generation unit 222 does not have to output the frequency information of the sound wave to the electromagnetic wave signal generation unit 203.

A terminal device 100 further includes the sound frequency generation unit 121 and the latitude and longitude extraction unit 123.

The sound frequency generation unit 121 calculates the frequency of the sound wave to be transmitted by the beacon 200, from latitude information and longitude information of the beacon 200 that is received from the latitude and longitude extraction unit 123. A method of calculating the sound wave frequency is the same as the method of calculating the frequency of the sound wave of the sound frequency generation unit 222 of the beacon 200. The sound frequency generation unit 121 outputs the calculated sound wave frequency to the frequency detection unit 104.

The latitude and longitude extraction unit 123 reads information of latitude and longitude of the beacon 200 from the electromagnetic wave signal received from an electromagnetic wave reception unit 101 and outputs the information to the sound frequency generation unit 121 and the distance calculation unit 105.

<Operation Example of the Terminal Device 100>

Figure 6:
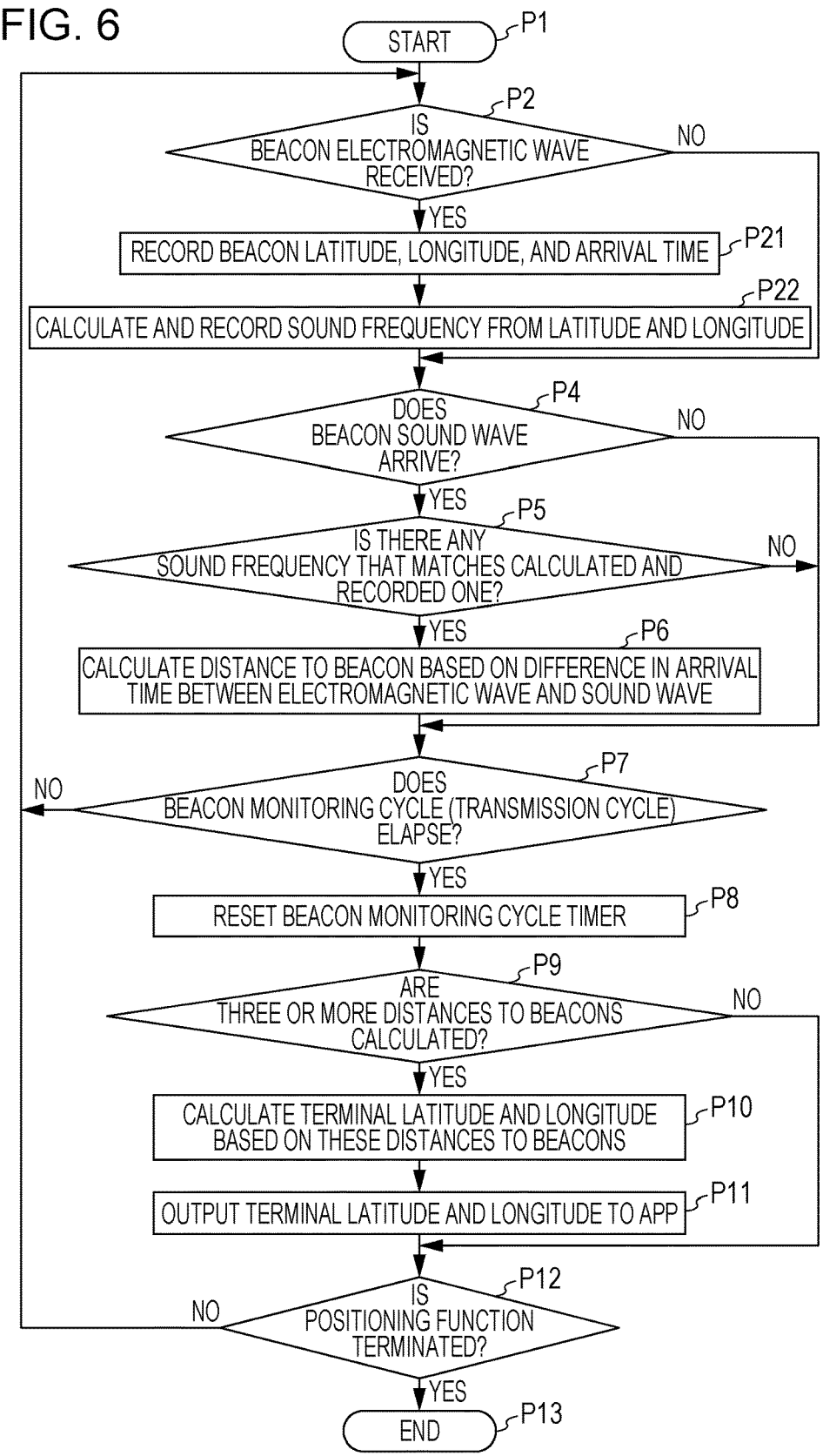
FIG. 6 is a flow illustrating an operation example of the terminal device.

An operation example of the terminal device 100 is described hereinafter. FIG. 6 illustrates a process flow to determine the location of the terminal device 100.

When receiving the electromagnetic wave from the beacon 200 by the antenna 108 (Y in step P2), the terminal device 100 causes the latitude and longitude extraction unit 123 to read the latitude information and longitude information of the beacon 200 from the electromagnetic wave signal. The terminal device 100 stores the read information of latitude and or longitude and arrival time of the electromagnetic wave in an internal memory of a distance calculation unit 105 (step P21). The terminal device 100 also causes the sound frequency generation unit 121 to calculate the frequency of the sound wave, transmitted by the beacon 200, and which is included in this received electromagnetic wave signal, and stores the calculated frequency in an internal memory of the frequency detection unit 104 (step P22). A method of calculating the frequency of the sound wave is described below. Then, when the terminal device 100 does not receive the sound wave from the beacon (N in step P4) and the beacon monitoring cycle does not elapse (N in step P7), the processing proceeds to step P2. Subsequent processing is similar to the second embodiment.

In the third embodiment, since the sound wave of a different frequency is used for the each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of installable beacons may be relaxed.

Moreover, since the sound wave frequency of the beacon 200 is calculated from the location information, an installer of the beacon may install the beacon 200 without setting a frequency for the beacon 200. Therefore, an operational mistake such as an error in frequency setting by the installer of the beacon 200 may not occur, and thus workload on the installer of the beacon 200 is alleviated.

<Method of Calculating the Sound Wave Frequency>

A method of calculating the sound wave frequency to be implemented in the beacon 200 and the terminal device 100 is described hereinafter.

A method of calculating the sound wave frequency according to this embodiment may only be a calculation method by which the frequency is uniquely determined from longitude and latitude. An example in which latitude and longitude are represented in a 32-bit Q23 format is described hereinafter. The Q23 format is a fixed-point format in which the number of bits in the decimal part is 23.

In this calculation method, lower 12 bits of a numeric value that represents latitude and longitude is used in the calculation. The lower 12 bits of the numeric value representative of latitude and longitude may represent a range of approximately 54 meters. Adjusting output so as to prevent the beacon 200 from transmitting the sound wave beyond 50 meters, for example, allows higher 20 bits other than the lower 12 bits to be ignored.

In addition, in this calculation method, lower 8 bits of the numeric value that represents latitude or longitude is not used in the calculation. The lower 8 bits of the numeric value representative of latitude and longitude may represent a range of approximately 3.4 meters. In this calculation method, installing the beacons 200 at a minimum interval of 5 meters, for example, allows the lower 8 bits to be ignored.

Specifically, in this calculation method, 4 bits from lower 9 bits to 12 bits of the numeric value that represents latitude and longitude are used in the calculation. Suppose that a frequency band to be used here is, for example, 20 kHz to 45.5 kHz in a non-audible region. When latitude and longitude are expressed by a numeric value (0 to 15) that may be represented by 4 bits, a frequency which does not overlap may be calculated with the following formula:

$$f = 20 + Le \times 1.6 + Lo \times 0.1 \quad (1)$$

where f represents the sound wave frequency in kHz to be calculated, Le a numeric value of 4 bits indicating latitude, and Lo a numeric value of 4 bits indicating longitude. FIG. 7 illustrates a list of frequencies calculated by using this formula (1). As illustrated in FIG. 7, calculation of the sound wave frequencies by using of the formula (1) enables assignment of all different frequencies to the each beacon 200.

Note that the formula may be changed depending on resolution of the numeric value representative of latitude or longitude, output of the sound wave of the beacon 200, interval of the beacons 200 to be installed, a range of the frequencies in use, or the like.

In addition, while the formula described above calculates the sound wave frequency from latitude and longitude of the beacon 200, the sound wave frequency may be calculated from information which may uniquely determine the beacons, such as a beacon ID or a serial number unique to the beacon, or the like.

Fourth Embodiment

A fourth embodiment is described hereinafter. In the fourth embodiment, the three most proximate beacons are selected in selection for three beacons to be used in calculation of location information.

<Configuration Example of the Location Information Determination System 10>

Figure 8:
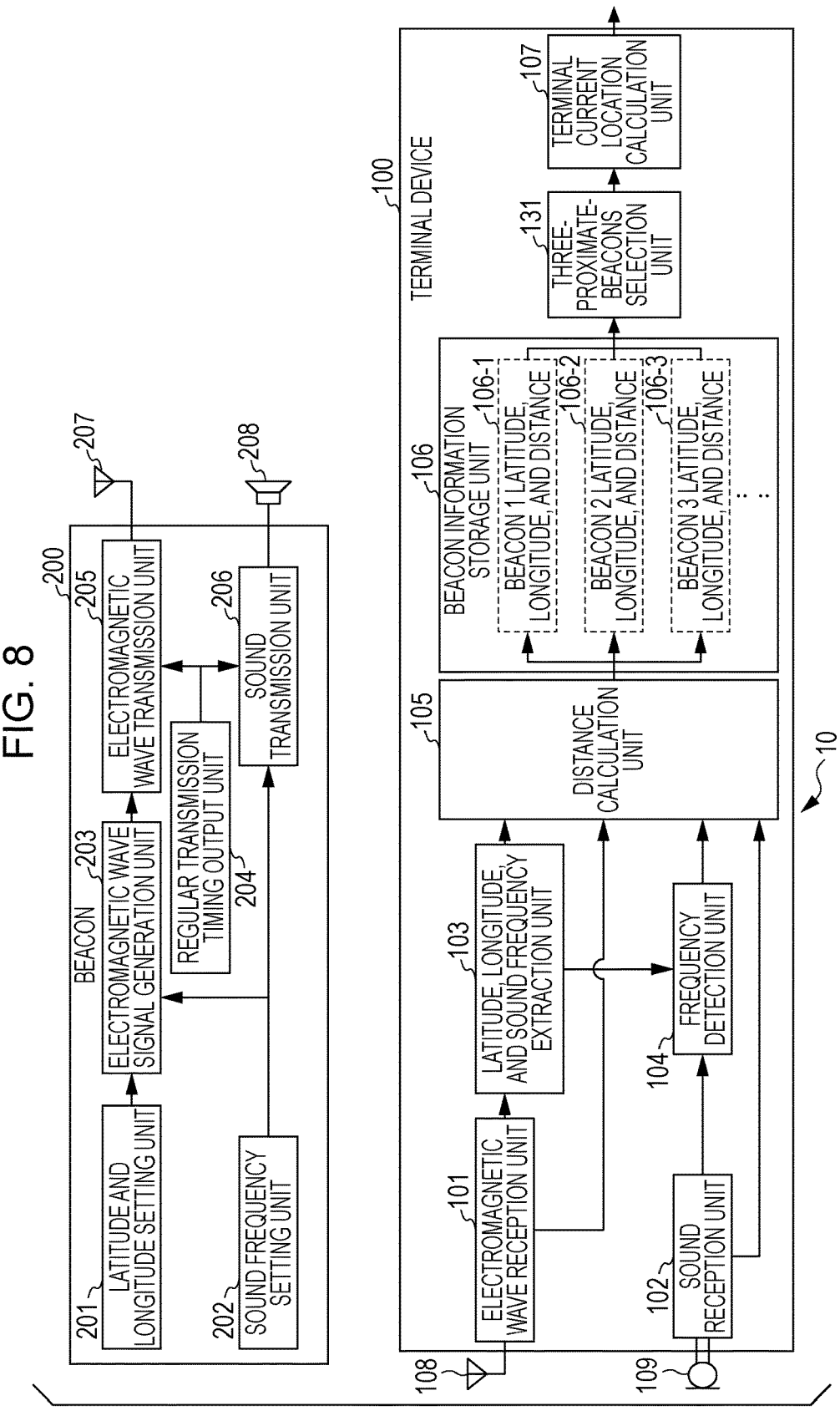
FIG. 8 is a view illustrating a configuration example of the location information determination system.

A configuration example of the location information determination system 10 is described. FIG. 8 illustrates the configuration example of the location information determination system 10.

A terminal device 100 further includes a three-proximate-beacons selection unit 131.

The three-proximate-beacons selection unit 131 selects the three beacons 200 in short distance order from a terminal device 100 from the internal memory of the beacon information memory unit 106 and outputs the information of the three beacons 200 to the terminal current location calculation unit 107.

<Operation Example of the Terminal Device 100>

Figure 9:
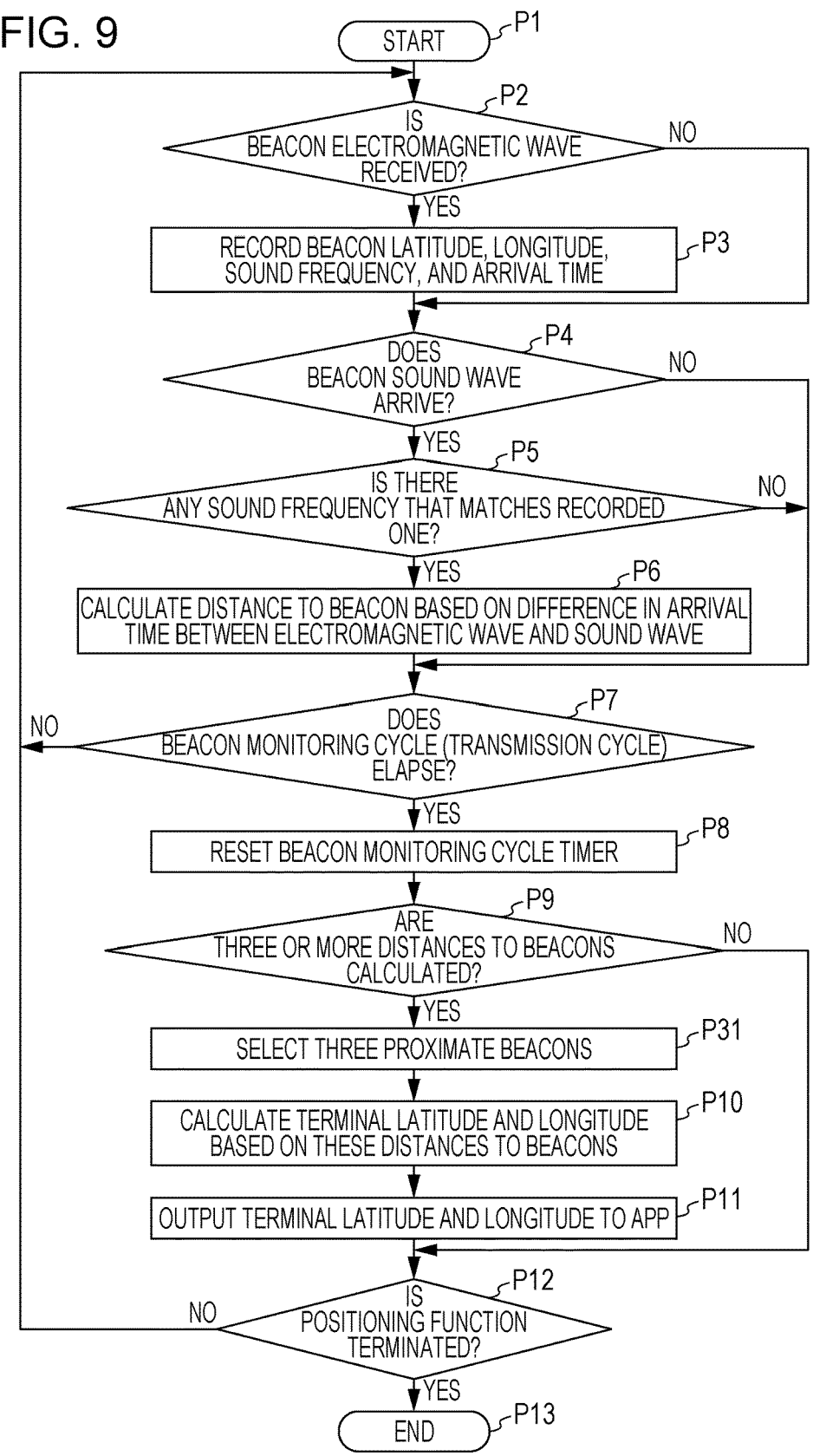
FIG. 9 is a flow illustrating an operation example of the terminal device.

An operation example of the terminal device 100 is described hereinafter. FIG. 9 illustrates a process flow to determine the location of the terminal device 100.

The process of the terminal device 100 in this embodiment is the same as in the second embodiment up to the process to determine whether three or more distances to the beacons are selected (step P9). When it is determined that more than three distances to the beacons are calculated (Y in step P9), the terminal device 100 selects the three beacons most proximate to the terminal device 100 (step P31). Instead, the terminal device 100 may store reception power values of the electromagnetic wave and the radio wave in advance and select the three beacons of the top three reception power values. Subsequent processing is the same as the second embodiment.

In the fourth embodiment, since the sound wave of a different frequency is used for the each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of installable beacons may be relaxed.

Moreover, the distance to the beacon 200 is calculated from a difference in arrival time between the electromagnetic wave and the sound wave, and any error may be generated in the arrival time of the sound wave due to any influence of an obstacle or a wall, for example. As the distance to the beacon 200 becomes longer, the sound wave travels by a longer distance before reaching the terminal device 100 after being transmitted. Thus, it is more likely that the sound wave is influenced by the obstacle or the wall, and a probability of occurrence of the above-mentioned error increases. Accordingly, selection of the three most-proximate beacons 200 lowers the probability of occurrence of the above-mentioned error, and may calculate the location of the terminal device 100 with high accuracy.

Furthermore, when three beacons 200 with the strongest reception power are selected, for example, calculation of a distance of any beacon 200 that is not selected may be omitted, which thus enables alleviation of processing load of the terminal device 100.

Fifth Embodiment

A fifth embodiment is described hereinafter. In the fifth embodiment, above the foregoing embodiments, when the distance to a beacon 200 is calculated, the sound wave that arrives later than a certain period of time is not used in the calculation.

<Configuration Example of the Location Information Determination System 10>

Figure 10:
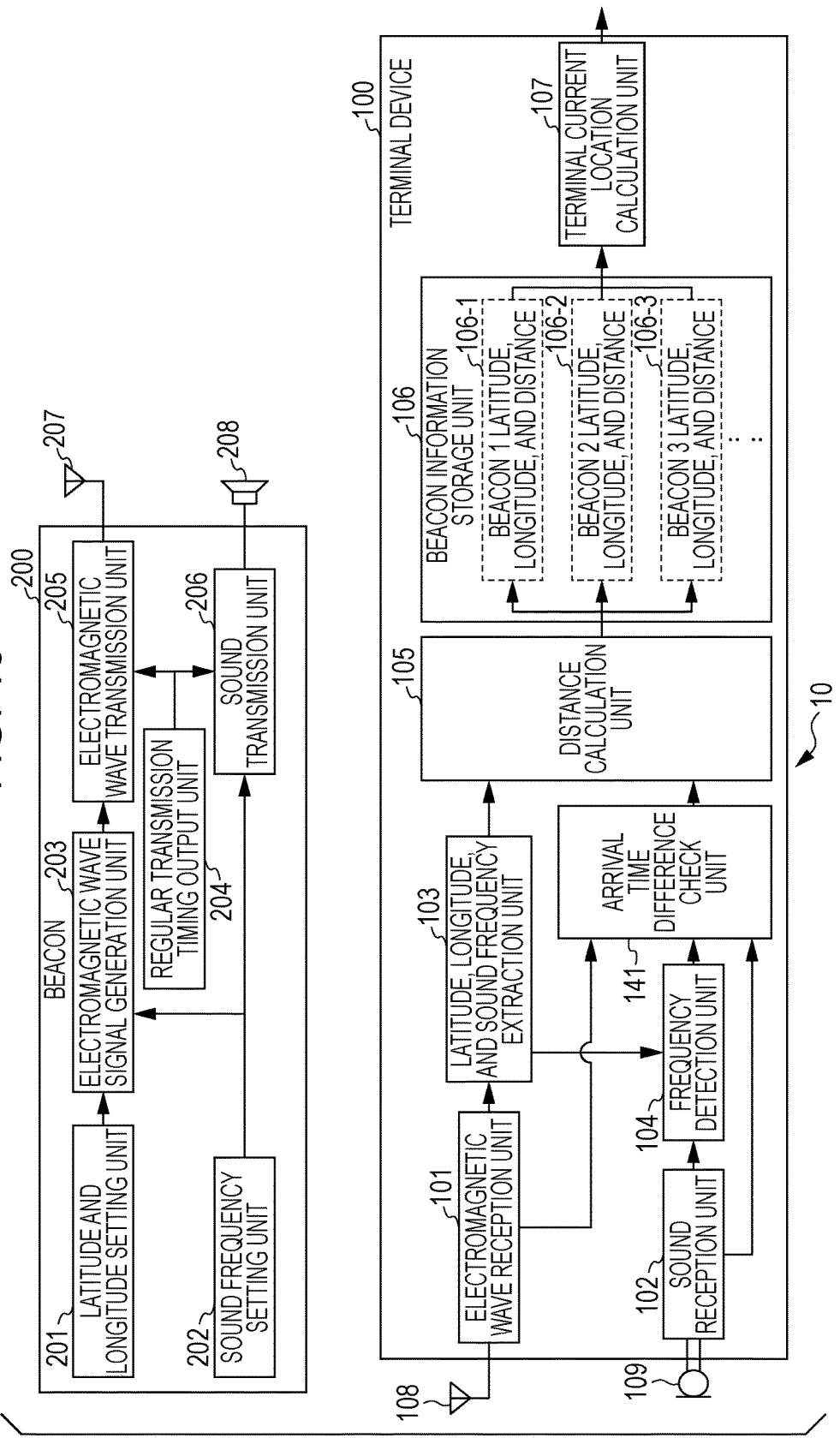
FIG. 10 is a view illustrating a configuration example of the location information determination system.

A configuration example of the location information determination system 10 is described. FIG. 10 illustrates the configuration example of the location information determination system 10.

The terminal device 100 further includes an arrival time difference check unit 141.

The arrival time difference check unit 141 calculates a difference between the reception time of the electromagnetic wave received from the electromagnetic wave reception unit 101 and the reception time of the sound wave received from the sound reception unit 102. The arrival time difference check unit 141 discards data of the reception time of the sound wave when the reception time difference between the electromagnetic wave and the sound wave is equal to or higher than a threshold, and outputs the reception time of the sound wave to the distance calculation unit 105 when the reception time difference is smaller than the threshold.

<Operation Example of the Terminal Device 100>

Figure 11:
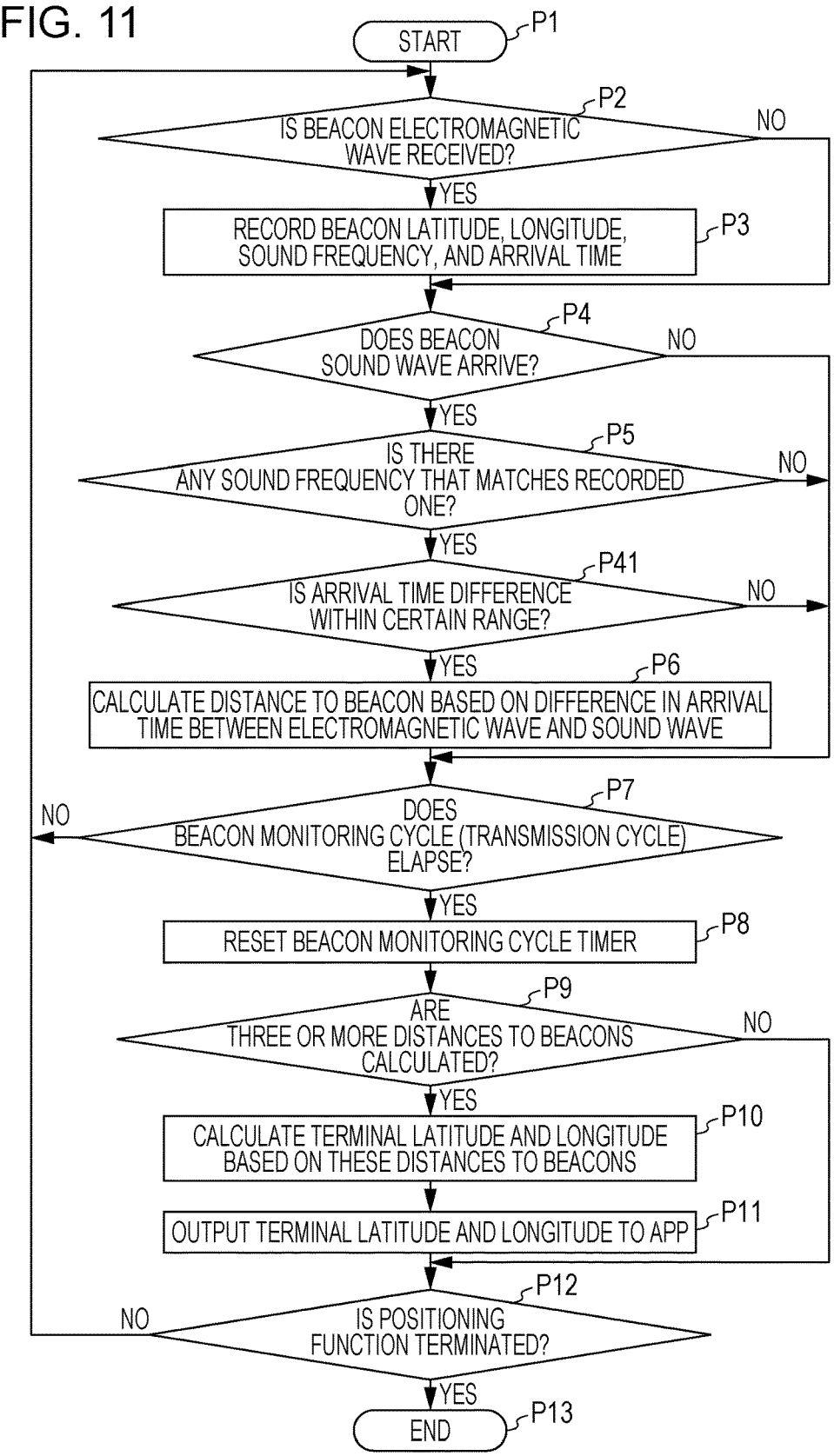
FIG. 11 is a flow illustrating an operation example of the terminal device.

An operation example of the terminal device 100 is described hereinafter. FIG. 11 illustrates an example of process flow to determine the location of the terminal device 100.

The process of the terminal device 100 is the same as the second embodiment before the process to determine that the frequency of the received sound wave matches the recorded frequency (Y in step P5). The terminal device 100 causes the arrival time difference check unit 141 to calculate a difference between the reception time of the sound wave and the reception time of the electromagnetic wave, and compare the difference with a threshold. When the difference of the reception time is equal to or higher than the threshold, the terminal device 100 discards data of the reception time (N in step P41) and proceeds to step 7. The threshold may be a numeric value calculated from the maximum distance of an area covered by the location information determination system 10, for example. When the difference between the reception times exceeds this threshold, it means that the sound wave is transmitted from outside of the area covered by the location information determination system 10, and may be determined as an improper sound wave such as a noise or a reflected wave. In addition, the threshold may be a numeric value calculated from the maximum distance reachable by the sound wave outputted and transmitted from by the beacon 200. When the difference between the reception times exceeds this threshold, it means that the sound wave is transmitted from the beacon 200 at an unreachable distance, and may be determined as an improper sound wave such as a noise or a reflected wave. In addition, when the difference between the reception times is smaller than the threshold, the terminal device 100 determines that the received sound wave is transmitted by the beacon 200 (Y in step P41). The subsequent process is the same as in the second embodiment.

In the fifth embodiment, since the sound wave of a different frequency is used for the each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of installable beacons may be relaxed.

Furthermore, the terminal device 100 may reduce any noise such as a reflected wave by not using the sound wave from when the arrival time difference between the electromagnetic wave and the sound wave is equal to or higher than a certain range in the distance calculation. The terminal device 100 may also exclude the sound wave of the beacon 200 for which the frequency set incorrectly. This improves the accuracy of the distance calculation at the terminal device 100, and also improves the accuracy of the location information.

Sixth Embodiment

A sixth embodiment is described hereinafter. In the sixth embodiment, the electromagnetic wave of a different frequency and the sound wave of a different frequency for the each beacon 200 are used. In addition, for example, a pulse wave is used for the electromagnetic wave and the sound wave (hereinafter referred to as an "electromagnetic wave pulse" and a "sound wave pulse") in the sixth embodiment. The pulse wave is a signal that undergoes a sharp change in a short period of time. In this embodiment, for example, since information is not included in the electromagnetic wave, the pulse wave may be used.

<Configuration Example of the Location Information Determination System 10>

Figure 12:
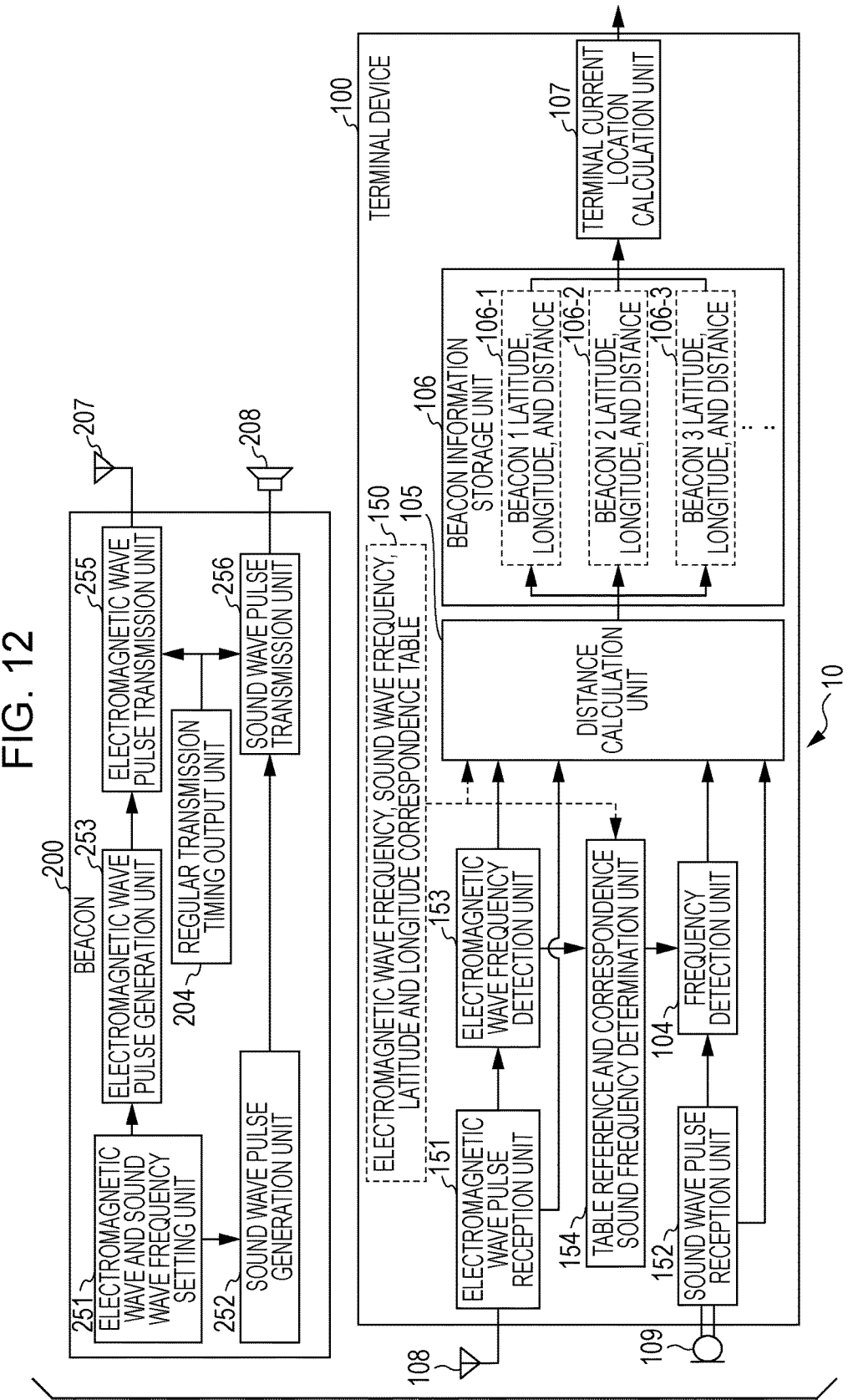
FIG. 12 is a view illustrating a configuration example of the location information determination system.

A configuration example of the location information determination system 10 is described. FIG. 12 illustrates the configuration example of the location information determination system 10.

The beacon 200 further includes an electromagnetic wave and sound wave frequency setting unit 251, a sound wave pulse generation unit 252, an electromagnetic wave pulse generation unit 253, an electromagnetic wave pulse transmission unit 255, and a sound wave pulse transmission unit 256.

The electromagnetic wave and sound wave frequency setting unit 251 outputs the frequency of the electromagnetic wave transmitted by the beacon 200 to the electromagnetic wave pulse generation unit 253, and outputs the frequency of the sound wave transmitted by the beacon 200 to the sound wave pulse generation unit 252. In addition, the electromagnetic wave and sound wave frequency setting unit 251 may store an electromagnetic wave frequency, sound wave frequency, latitude and longitude correspondence table 150 in an internal memory of the beacon 200 and read the frequencies of the sound wave and the electromagnetic wave to be transmitted from the table 150. Note that the electromagnetic wave frequency, sound wave frequency, latitude and longitude correspondence table 150 stored in the internal memory of the beacon 200 is the same as the electromagnetic wave frequency, sound wave frequency, latitude and longitude correspondence table 150 stored in the internal memory of the terminal device 100. The electromagnetic wave frequency, sound wave frequency, latitude and longitude correspondence table 150 is described below.

The sound wave pulse generation unit 252 generates a sound wave pulse signal with the frequency of the sound wave received from the electromagnetic wave and sound wave frequency setting unit 251, and outputs the sound wave pulse signal to the sound wave pulse transmission unit 256.

The electromagnetic wave pulse generation unit 253 generates an electromagnetic wave pulse signal with the frequency of the electromagnetic wave received from the electromagnetic wave and sound wave frequency setting unit 251, and outputs the electromagnetic wave pulse signal to the electromagnetic wave pulse transmission unit 255.

The electromagnetic wave pulse transmission unit 255 transmits the electromagnetic wave pulse signal received from the electromagnetic wave pulse generation unit 253 to the terminal device 100.

The sound wave pulse transmission unit 256 transmits the sound wave pulse signal received from the sound wave pulse generation unit 252 to the terminal device 100.

The terminal device 100 further includes the electromagnetic wave frequency, sound wave frequency, latitude and longitude correspondence table 150, an electromagnetic pulse reception unit 151, a sound wave pulse reception unit 152, an electromagnetic wave frequency detection unit 153, and a table reference and correspondence sound frequency determination unit 154.

The electromagnetic wave frequency, sound wave frequency, latitude and longitude correspondence table 150 is a table presenting correspondence among latitude and longitude of the beacon 200, the electromagnetic wave frequencies, and the sound wave frequencies. FIG. 13 illustrates an example of the electromagnetic wave frequency, sound wave frequency, latitude and longitude correspondence table 150. The electromagnetic wave frequency, sound wave frequency, latitude and longitude correspondence table 150 stores "Radio wave frequency (MHz)", "Sound frequency (kHz)", "Latitude", and "Longitude" as information, for example. The "Radio wave frequency (MHz)" is a frequency of the electromagnetic wave transmitted by the beacon 200, for example, and expressed in terms of MHz. The "Sound frequency (kHz)" is the frequency of the sound wave transmitted by the beacon 200, for example, and expressed in terms of kHz. The "Latitude" and "Longitude" indicate the location of the beacon 200, for example, and represent latitude and longitude. The terminal device 100 may acquire the electromagnetic wave frequency, sound wave frequency, latitude and longitude correspondence table 150 by, for example, communicating with a server that manages the table or may store the table in advance in an internal memory.

The electromagnetic wave pulse reception unit 151 receives the electromagnetic pulse signal from the antenna 108. The electromagnetic wave pulse reception unit 151 outputs the reception time of the electromagnetic wave pulse to the distance calculation unit 105. The electromagnetic wave pulse reception unit 151 also demodulates the received electromagnetic wave pulse signal, and outputs the received electromagnetic wave pulse signal to the electromagnetic wave frequency detection unit 153.

The sound wave pulse reception unit 152 receives the sound wave pulse signal from the microphone 109. The sound wave pulse reception unit 152 outputs the reception time of the sound wave pulse to the distance calculation unit 105. The sound wave pulse reception unit 152 also demodulates the received sound wave pulse signal, and outputs the received sound wave pulse signal to the frequency detection unit 104.

The electromagnetic wave frequency detection unit 153 detects the frequency of the electromagnetic wave pulse signal received from the electromagnetic wave pulse reception unit 151 and outputs the frequency to the table reference and correspondence sound frequency determination unit 154.

The table reference and correspondence sound frequency determination unit 154 reads the frequency of the sound wave pulse corresponding to the frequency of the electromagnetic wave pulse received from the electromagnetic wave frequency detection unit 153 from the electromagnetic wave frequency, sound wave frequency, latitude and longitude correspondence table 150, and outputs the frequency of the sound wave pulse to the frequency detection unit 104.

<Operation Example of the Terminal Device 100>

Figure 14:
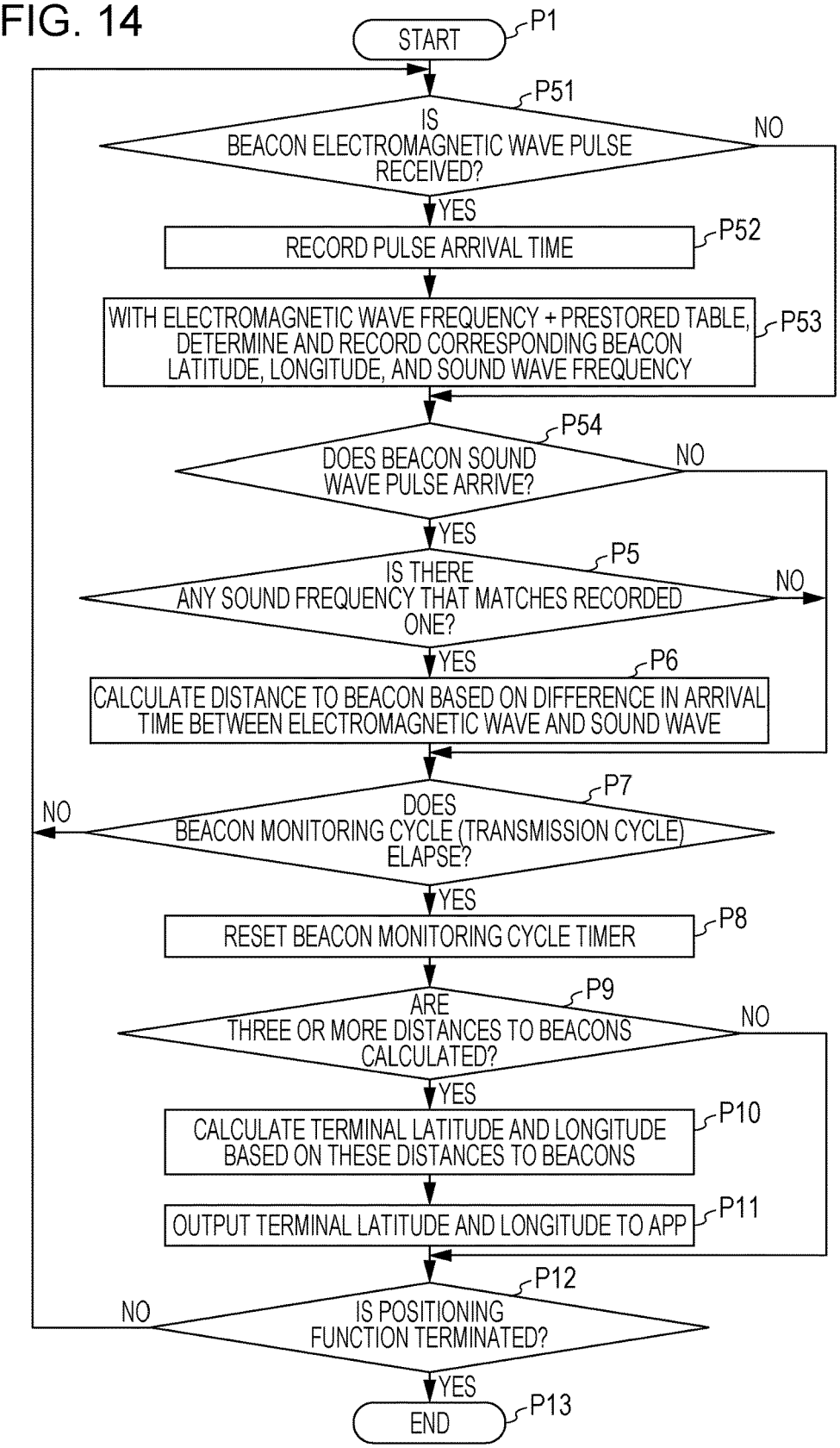
FIG. 14 is a flow illustrating an operation example of the terminal device.

An operation example of the terminal device 100 is described hereinafter. FIG. 14 illustrates an example of a process flow to determine the location of the terminal device 100.

When receiving the electromagnetic wave pulse or the sound wave pulse, the terminal device 100 starts processing to determine the location information of the terminal device 100 (step P1).

When receiving the electromagnetic wave pulse from the beacon 200 by the antenna 108 (Y in step P51), the terminal device 100 stores the reception time of the electromagnetic wave pulse in the internal memory of the distance calculation unit 105 (step P52). The terminal device 100 also causes the electromagnetic wave frequency detection unit 153 to extract the frequency of the received electromagnetic wave pulse, and outputs the frequency to the table reference and correspondence sound frequency determination unit 154. The terminal device 100 causes the table reference and correspondence sound frequency determination unit 154 to read the frequency of the sound wave pulse, latitude, and longitude corresponding to the extracted frequency of the electromagnetic wave pulse, from the electromagnetic wave frequency, sound wave frequency, latitude and longitude correspondence table 150. The terminal device 100 stores the read frequency of the sound wave pulse, latitude, and longitude in the internal memory of the frequency detection unit 104 (step P53).

Then, when receiving the sound wave pulse from the beacon 200 by the microphone 109 (N in step P51, Y in step P54), the terminal device 100 stores the reception time of the sound wave pulse in the internal memory of the distance calculation unit 105. Subsequent processing is the same as the second embodiment.

Note that in the sixth embodiment, although a pulse wave is used for the electromagnetic wave and the sound wave, the electromagnetic wave and the sound wave do not have to be a pulse wave, for example.

In the sixth embodiment, since the sound wave pulse of a different frequency is used for the each beacon 200, the terminal device 100 does not make an incorrect combination of the electromagnetic wave pulse and the beacon 200 from which the sound wave pulse is transmitted. Thus, the terminal device 100 may correctly calculate the distance to the beacon 200 and correctly calculate the location of the terminal device 100.

In addition, since the sound wave pulse of a different frequency is used for the each beacon 200, there is less interference between the sound waves. Thus, since there is less interference of the sound waves even when multiple beacons 200 are installed in proximity, a restriction on the number of the installable beacons may be relaxed.

Furthermore, since the electromagnetic wave pulse of a different frequency is used for the each beacon 200, there is less interference between the electromagnetic waves. Thus, since there is less interference of the electromagnetic wave pulses even when multiple beacons 200 are installed in proximity, a restriction on the number of the installable beacons may be relaxed.

In addition, by storing the electromagnetic wave frequency, sound wave frequency, latitude and longitude correspondence table 150 in advance in the internal memory or acquiring from an external server, for example, the beacon 200 may determine the frequencies of the electromagnetic wave and the sound wave to transmit from its own table. Thus, when the beacon 200 is installed, for example, the each beacon 200 may be installed without setting a frequency or the like. Thus, workload on the installer of the beacon 200 is reduced, and the installer may not make any mistake in setting or the like.

Furthermore, since no information is included in the electromagnetic wave, a pulse wave may be used in the electromagnetic wave, which saves implementation of a protocol for analyzing information of the electromagnetic waves. The terminal device 100 or the beacon 200 may be capable without implementing a control chip such as Wi-Fi or Bluetooth (Registered Trademark) for information analysis of the electromagnetic waves, for example. Thus, the creating cost for the terminal device 100 and the beacon 200 may be reduced.

Seventh Embodiment

A seventh embodiment is described hereinafter. In the seventh embodiment, above the foregoing embodiments, the electromagnetic waves transmitted by the beacon 200 includes the beacon ID (also referred to as identification information), and the terminal device 100 determines the location information and the sound wave frequency from the beacon ID, using a table.

<Configuration Example of the Location Information Determination System 10>

Figure 15:
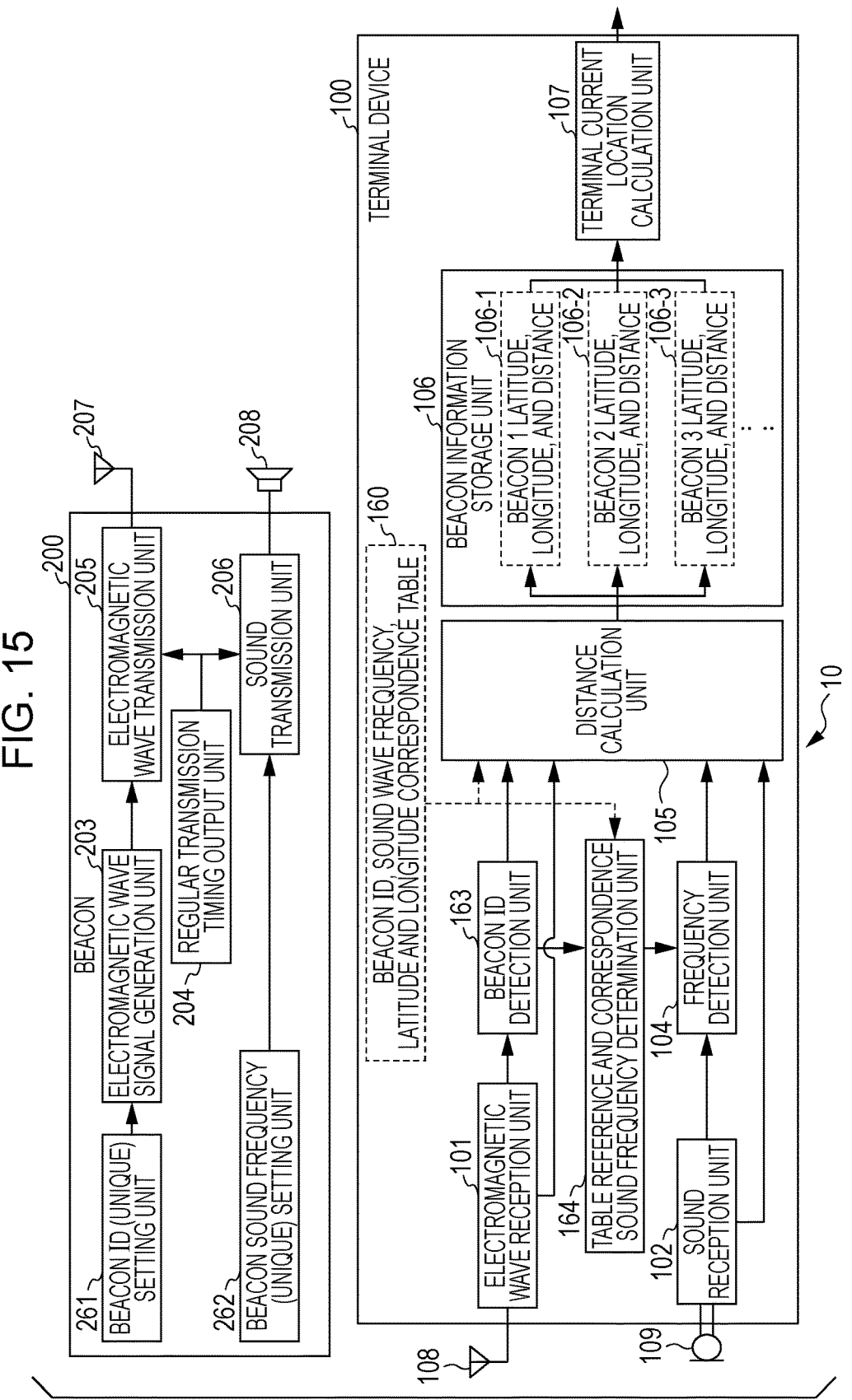
FIG. 15 is a view illustrating a configuration example of the location information determination system.
Figure 17:
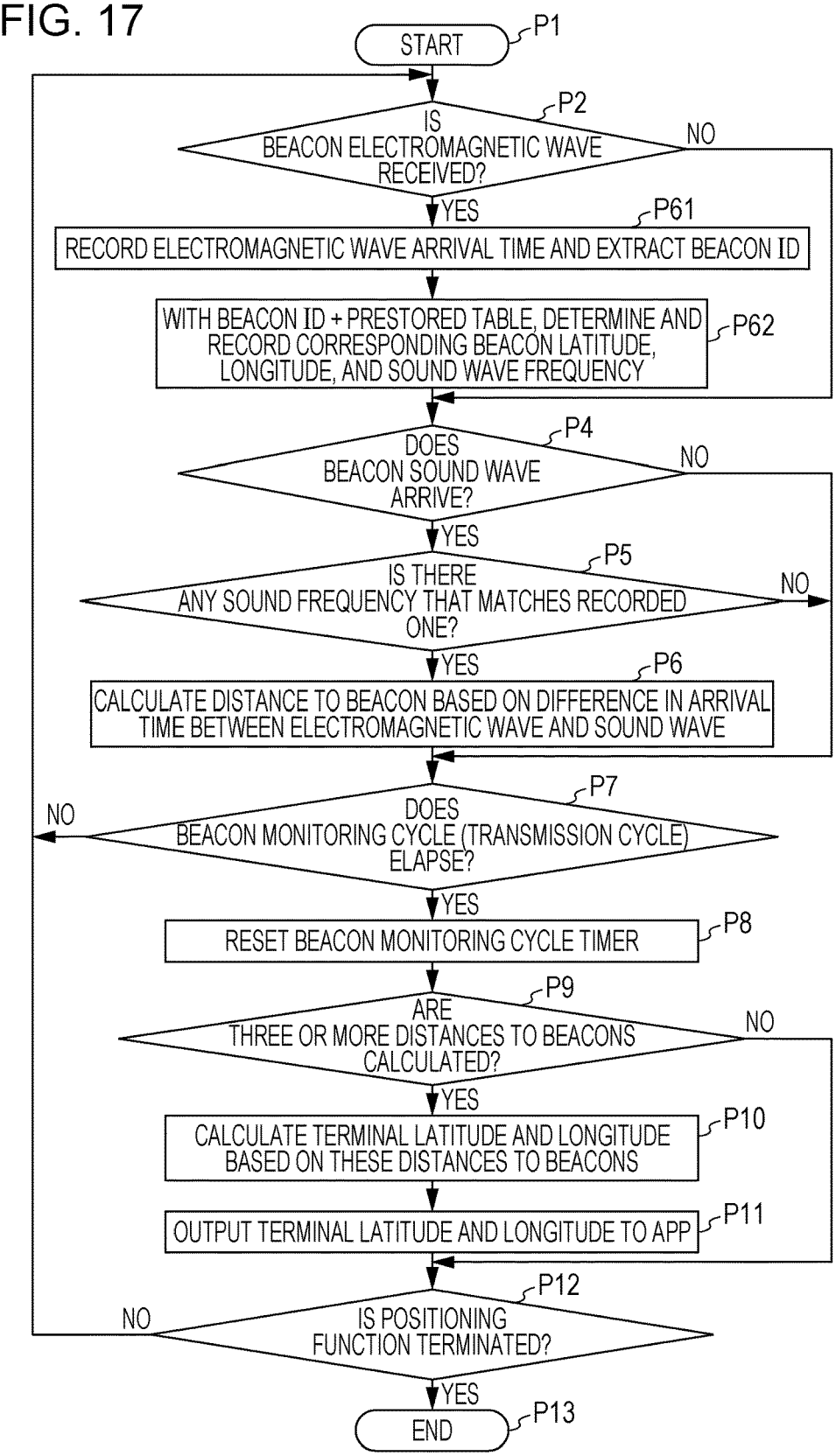
FIG. 17 is a flow illustrating an operation example of the terminal device.

A configuration example of the location information determination system 10 is described. FIG. 15 illustrates the configuration example of the location information determination system 10.

The beacon 200 further includes a beacon ID (unique) setting unit 261 and a beacon sound frequency (unique) setting unit 262.

The beacon (unique) setting unit 261 reads the beacon ID unique to the beacon 200 from the internal memory and outputs the beacon ID to the electromagnetic wave signal generation unit 203.

The beacon sound frequency (unique) setting unit 262 outputs the sound wave frequency to the sound transmission unit 206. Note that the beacon sound frequency (unique) setting unit 262 may read the frequency of the sound wave corresponding to the beacon ID from a beacon ID, sound wave frequency, longitude and latitude correspondence table 160 which is stored in the internal memory of the beacon 200. The beacon ID, sound wave frequency, longitude and latitude correspondence table 160 is, for example, the same table as the beacon ID, sound wave frequency, longitude and latitude correspondence table 160 which is stored in the internal memory of the terminal device 100. The beacon ID, sound wave frequency, longitude and latitude correspondence table 160 is described below.

The terminal device 100 further includes the beacon ID, sound wave frequency, longitude and latitude correspondence table 160, a beacon ID detection unit 163, and a table reference and correspondence frequency determination unit 164.

The beacon ID, sound wave frequency, longitude and latitude correspondence table 160 is a table presenting correspondence among a beacon ID, latitude, longitude, and the sound wave frequency of the beacon 200. FIG. 16 illustrates an example of the beacon ID, sound wave frequency, longitude and latitude correspondence table 160. The beacon ID, sound wave frequency, longitude and latitude correspondence table 160 stores "Beacon ID", "Sound frequency (kHz)", "Latitude", and "Longitude" as information, for example. The "Beacon ID" is a unique ID of the beacon 200, for example. The "Sound frequency (kHz)" is the frequency of the sound wave transmitted by the beacon 200, for example, and expressed in terms of kHz. The "Latitude" and "Longitude" indicate the location of the beacon 200, for example, and represent latitude and longitude. The terminal device 100 may acquire the beacon ID, sound wave frequency, longitude and latitude correspondence table 160 by, for example, communicating with a server that manages the table or may store the table in advance in an internal memory.

The beacon ID detection unit 163 extracts the beacon ID from the electromagnetic wave signal received from the electromagnetic wave reception unit 101, and outputs the beacon ID to the distance calculation unit 105 and the table reference and correspondence sound frequency determination unit 164.

The table reference and correspondence sound frequency determination unit 164 reads the frequency of the sound wave corresponding to the beacon ID, received from the beacon ID detection unit 163, from the beacon ID, sound wave frequency, longitude and latitude correspondence table 160, and outputs the frequency of the sound wave to the frequency detection unit 104.

<Operation Example of the Terminal Device 100>

An operation example of the terminal device 100 is described hereinafter. FIG. 14 illustrates an example of process flow to determine the location of the terminal device 100.

When receiving an electromagnetic wave or a sound wave, the terminal device 100 starts processing to determine the location information of the terminal device 100 (step P1).

When receiving the electromagnetic wave from the beacon 200 by the antenna 108 (Y in step P2), the terminal device 100 stores the arrival time of the electromagnetic wave in the internal memory of the distance calculation unit 105 (step P61). The terminal device 100 also causes the beacon ID detection unit 163 to extract the beacon ID from the received electromagnetic wave signal (step P61), and outputs the beacon ID to the table reference and correspondence sound frequency determination unit 164. The terminal device 100 causes the table reference and correspondence sound frequency determination unit 164 to read the frequency of the sound wave, latitude, and longitude corresponding to the extracted beacon ID from the beacon ID, sound wave frequency, longitude and latitude correspondence table 160, and stores the frequency of the sound wave, latitude, and longitude in the internal memory of the frequency detection unit 104 (step P62). Subsequent processing is the same as the second embodiment.

In the seventh embodiment, since the sound wave of a different frequency is used for the each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of the installable beacons may be relaxed.

In addition, by storing the beacon ID, sound wave frequency, longitude and latitude correspondence table 160 in advance in an internal memory or acquiring from an external server, for example, the beacon 200 may determine the frequency of the sound wave to transmit from its own table. Thus, when the beacon 200 is installed, for example, the each beacon 200 may be installed without setting the frequency or the like. Thus, workload on the installer of the beacon 200 is reduced, and the installer may not make a mistake in setting or the like.

Other Embodiments

Other embodiments are described hereinafter. A hardware configuration of the terminal device 100 and the beacon 200 is described.

Figure 18:
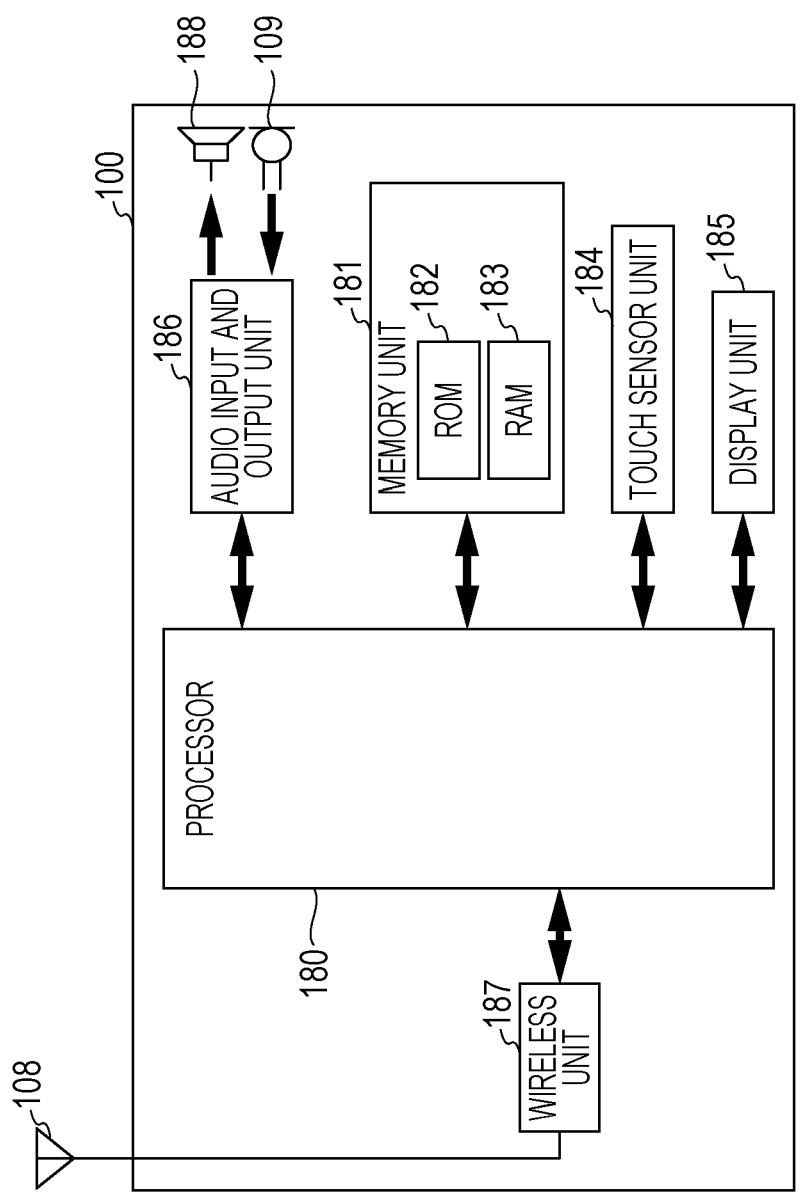
FIG. 18 is a view illustrating a hardware configuration example of the terminal device.

FIG. 18 illustrates a hardware configuration of the terminal device 100. The terminal device 100 includes the antenna 108, the microphone 109, a processor 180, a memory unit 181, a touch sensor unit 184, a display unit 185, an audio input and output unit 186, a wireless unit 187, and a speaker 188.

The antenna 108 and the microphone 109 in the second embodiment each correspond to the antenna 108 and the microphone 109 in this embodiment, for example.

The function of the electromagnetic wave reception unit 101 in the second embodiment is implemented by the wireless unit 187, for example.

The function of the sound reception unit 102 in the second embodiment is implemented by the audio input and output unit 186, for example.

The memory areas 106-1, 106-2, 106-3, . . . in the second embodiment are areas on the RAM 183, for example.

Other functions in the second embodiment are implemented by the processor 180 reading a program from the ROM 182 provided in the memory unit 181, loading the program to the RAM 183 provided in the memory unit 181, and executing the load program, for example.

The touch sensor unit 184 acquires input information from a touch screen of the terminal device 100 and outputs the input information to the processor 180, for example.

The display unit 185 is a liquid crystal display which is included in the terminal device 100, and displays information received from the processor 180 on the liquid crystal display, for example.

The speaker 188 outputs sound information received from the processor 180, for example.

Figure 19:
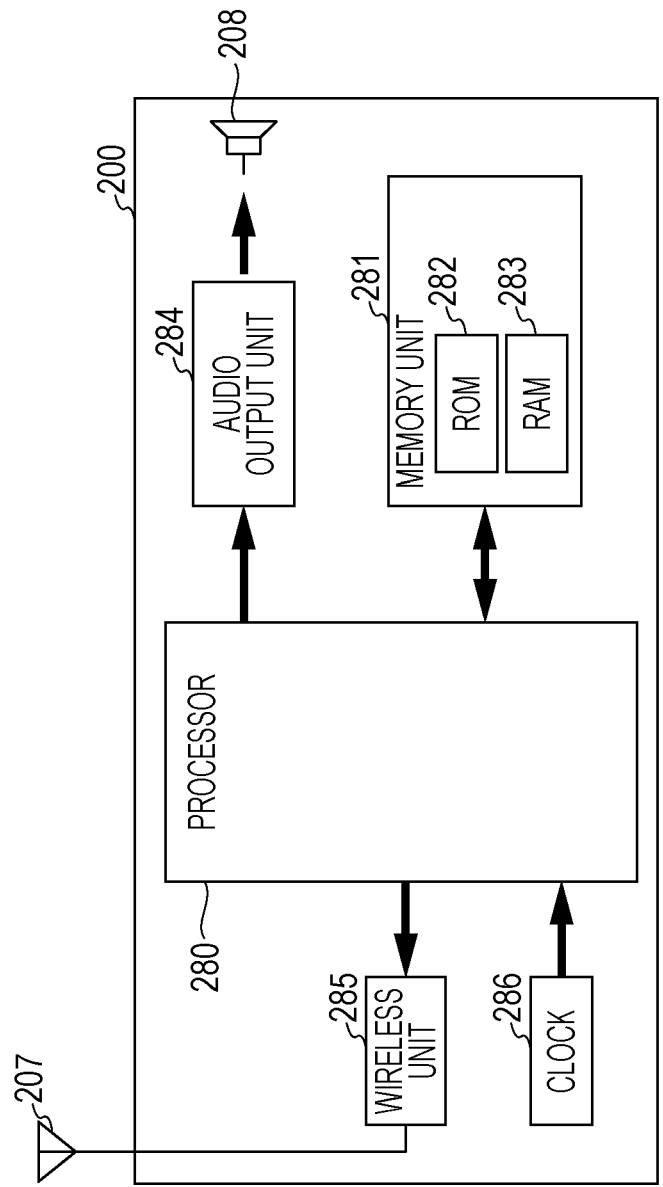
FIG. 19 is a view illustrating a hardware configuration example of the beacon.
Figure 20:
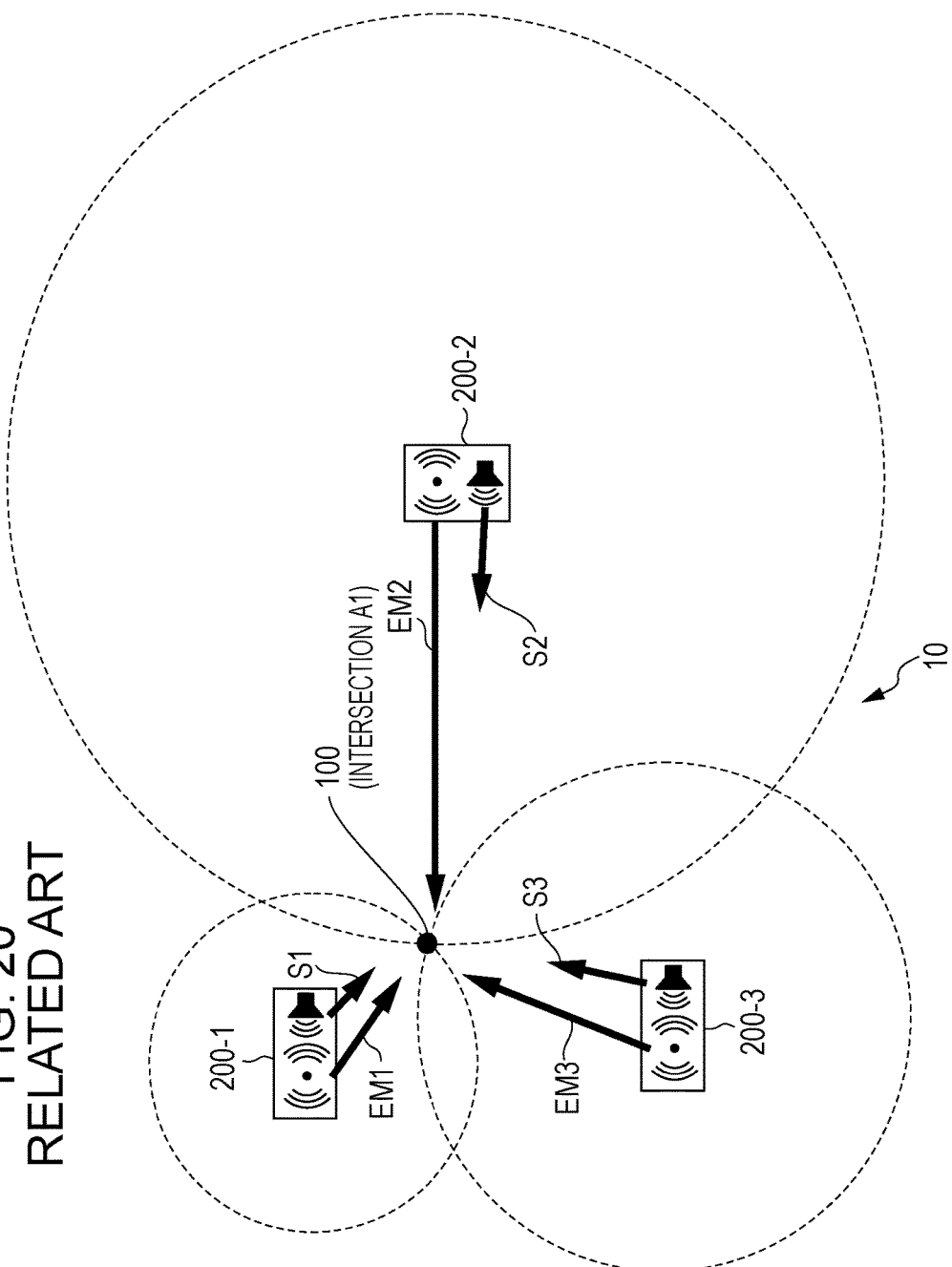
FIG. 20 is a view illustrating a configuration example of the location information determination system.

FIG. 19 illustrates a hardware configuration example of the beacon 200.

The beacon 200 includes an antenna 207, a speaker 208, a processor 280, a memory unit 281, an audio output unit 284, a wireless unit 285, and a clock 286.

The antenna 207 and the speaker 208 in the second embodiment correspond to the antenna 207 and the speaker 208 in this embodiment, for example.

The function of the regular transmission timing output unit 204 in the second embodiment is implemented by the clock 286, for example.

The function of the electromagnetic wave transmission unit 205 in the second embodiment is implemented by the wireless unit 285, for example.

The function of the sound transmission unit 206 in the second embodiment is implemented by the audio output unit 284, for example.

Other functions in the second embodiment are implemented by the processor 280 reading a program from the ROM 282 provided in the memory unit 281, loading the program to the RAM 283 provided in the memory unit 281, and executing the load program, for example.

In this embodiment, since the sound wave of a different frequency is used for the each beacon 200, the terminal device 100 does not make an incorrect combination of the electromagnetic wave and the beacon 200 from which the sound wave is transmitted. Thus, the terminal device 100 may correctly calculate the distance to the beacon 200 and correctly calculate the location of the terminal device 100.

In addition, since the sound wave of a different frequency is used for the each beacon 200, there is less interference between the sound waves. Thus, since there is less interference of the sound waves even when multiple beacons 200 are installed in proximity, a restriction on the number of the installable beacons may be relaxed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A terminal device, comprising:
   a receiver configured to receive a first sound wave and a first electromagnetic wave including a first frequency of the first sound wave from a first beacon and a second sound wave and a second electromagnetic wave including a second frequency of the second sound wave from a second beacon; and
   a processor configured to:
      extract the first frequency from the first electromagnetic wave when the first electromagnetic wave is received;
      record first information of the first frequency in a memory in association with a first location of the first beacon and a first reception time of the first electromagnetic wave;
      extract the second frequency from the second electromagnetic wave when the second electromagnetic wave is received;
      record second information of the second frequency in the memory when the second electromagnetic wave is received in association with a second location of the second beacon and a second reception time of the second electromagnetic wave;
      compare, when one of the first sound wave and the second sound wave is received, a frequency of the received sound wave with frequencies in the memory;
      determine, when the frequency of the received sound wave matches the first frequency in the memory, that a first combination of the first electromagnetic wave and the first sound wave is received;
      determine, when the frequency of the received sound wave matches the second frequency in the memory, that a second combination of the second electromagnetic wave and the second sound wave is received;
      calculate a first distance of the first beacon or a second distance of the second beacon when determining the first combination or the second combination is received; and
      determine a location of the terminal device based on the first distance and the second distance.

2. The terminal device according to claim 1, wherein the first electromagnetic wave further includes first location information which indicates the first location of the first beacon, and the second electromagnetic wave further includes second location information which indicates the second location of the second beacon.

3. The terminal device according to claim 1, wherein the first electromagnetic wave includes first location information which indicates the first location of the first beacon, the second electromagnetic wave includes second location information which indicates the second location of the second beacon, and the processor is configured to determine the first and second frequencies based on the first and second location information.

4. The terminal device according to claim 1, wherein the receiver further receives a third sound wave and a third electromagnetic wave including a third frequency of the third sound wave from a third beacon and a fourth sound wave and a fourth electromagnetic wave including a fourth frequency of the fourth sound wave from a fourth beacon, and, the processor:
  records third information of the third frequency in the memory when the third electromagnetic wave is received;
  records fourth information of the fourth frequency in the memory when the fourth electromagnetic wave is received;
  determines, when one of the third sound wave and the fourth sound wave is received, whether a third combination of the third electromagnetic wave and the third sound wave or a fourth combination of the fourth electromagnetic wave and the fourth sound wave is received by determining whether the third information or the fourth information is recorded in the memory;
  calculates a third distance of the third beacon or a fourth distance of the fourth beacon when determining the third combination or the fourth combination;
  selects three beacons most proximate to the terminal device among the first, the second, the third, and the fourth beacons; and
  determines the location of the terminal device based on the selected three beacons.

5. The terminal device according to claim 1, wherein the processor calculates the first distance between the first beacon and the terminal device when a time difference between the first reception time and a third reception time of the first sound wave is smaller than a threshold, and does not calculate the first distance between the first beacon and the terminal device when the time difference is equal to or higher than the threshold, and the processor calculates the second distance between the second beacon and the terminal device when a time difference between the second reception time and a fourth reception time of the second sound wave is smaller than a threshold, and does not calculate the second distance between the second beacon and the terminal device when the time difference is equal to or higher than the threshold.

6. The terminal device according to claim 1, further comprising:
  a table presenting correspondence among frequencies of the first and second electromagnetic waves, the first and second frequencies, and first and second location information indicating the first location of the first beacon and the second location of the second beacon,
  wherein the first electromagnetic wave and the second electromagnetic wave are of different frequencies, the processor determines the first beacon from the table, based on the frequency of the first electromagnetic wave and the first frequency, and the processor determines the second beacon from the table, based on the frequency of the second electromagnetic wave and the second frequency.

7. The terminal device according to claim 1, further comprising:
  a table presenting correspondence among the first and second frequencies, first and second identification information to determine the first and second beacons, respectively, and first and second location information indicating the first location of the first beacon and the second location of the second beacon,
  wherein the first electromagnetic wave includes the first identification information, the second electromagnetic wave indicates the second identification information, the processor determines the first beacon from the table, based on the first identification information and the first frequency, and the processor determines the second beacon from the table, based on the second identification information and the second frequency.

8. A terminal device, comprising:
  a receiver configured to receive, from a first beacon, a first sound wave and a first electromagnetic wave including first location information which indicates a first location of the first beacon and receive, from a second beacon, a second sound wave and a second electromagnetic wave including second location information which indicates a second location of the second beacon; and
  a processor configured to:
    extract the first location from the first electromagnetic wave when the first electromagnetic wave is received;
    calculate a first frequency of the first sound wave based on the first location information to record first information of the first frequency in a memory in association with the first location and a first reception time of the first electromagnetic wave;
    extract the second location from the second electromagnetic wave when the second electromagnetic wave is received;
    calculate a second frequency of the second sound wave based on the second location information to record second information of the second frequency in the memory when the second electromagnetic wave is received in association with the second location and a second reception time of the second electromagnetic wave;
    compare, when one of the first sound wave and the second sound wave is received, a frequency of the received sound wave with frequencies in the memory;
    determine, when the frequency of the received sound wave matches the first frequency in the memory, that a first combination of the first electromagnetic wave and the first sound wave;
    determine, when the frequency of the received sound wave matches the second frequency in the memory, that a second combination of the second electromagnetic wave and the second sound wave is received;
    calculate a first distance of the first beacon or a second distance of the second beacon when determining the first combination or the second combination is received; and
    determine a location of the terminal device based on the first distance and the second distance.

9. A location information determination system, comprising:

a first beacons configured to transmit a first electromagnetic wave including a first frequency of the first sound wave and a first sound wave;

a second beacon configured to transmit a second electromagnetic wave including a second frequency of the second sound wave and a second sound wave; and a terminal device configured to receive the first electromagnetic wave, the first sound wave, the second electromagnetic wave and the second sound wave, wherein the terminal device includes a processor configured to:

extract the first frequency from the first electromagnetic wave when the first electromagnetic wave is received;

record first information of the first frequency in a memory in association with a first location of the first beacon and a first reception time of the first electromagnetic wave;

extract the second frequency from the second electromagnetic wave when the second electromagnetic wave is received;

record second information of the second frequency in the memory in association with a second location of the second beacon and a second reception time of the second electromagnetic wave;

compare, when one of the first sound wave and the second sound wave is received, a frequency of the received sound wave with frequencies in the memory;

determine, when the frequency of the received sound wave matches the first frequency in the memory, that a first combination of the first electromagnetic wave and the first sound wave;

determine, when the frequency of the received sound wave matches the second frequency in the memory, that a second combination of the second electromagnetic wave and the second sound wave is received;

calculate a first distance of the first beacon or a second distance of the second beacon when determining the first combination or the second combination is received; and determine a location of the terminal device based on the first distance and the second distance.

* * * * *